(12) United States Patent
Zou et al.

(10) Patent No.: US 9,755,933 B2
(45) Date of Patent: Sep. 5, 2017

(54) METHOD AND SYSTEM FOR MEASURING AUDIO TRANSMISSION DELAY

(71) Applicant: TENCENT TECHNOLOGY (SHENZHEN) COMPANY LIMITED, Shenzhen, Guangdong (CN)

(72) Inventors: Lianping Zou, Guangdong (CN); Wenting Zhang, Guangdong (CN); Hang He, Guangdong (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 15/038,861

(22) PCT Filed: Nov. 25, 2014

(86) PCT No.: PCT/CN2014/092198
§ 371 (c)(1),
(2) Date: May 24, 2016

(87) PCT Pub. No.: WO2015/078359
PCT Pub. Date: Jun. 4, 2015

(65) Prior Publication Data
US 2017/0005896 A1  Jan. 5, 2017

(30) Foreign Application Priority Data
Nov. 27, 2013  (CN) .......................... 2013 1 0616487

(51) Int. Cl.
*H04M 7/00*  (2006.01)
*H04L 12/26*  (2006.01)
(Continued)

(52) U.S. Cl.
CPC ....... *H04L 43/0858* (2013.01); *H04B 17/364* (2015.01); *H04L 7/0079* (2013.01);
(Continued)

(58) Field of Classification Search
CPC .. H04M 7/006; H04M 7/0081; H04M 7/0084; H04L 65/10; H04L 65/1059
See application file for complete search history.

(56) References Cited

U.S. PATENT DOCUMENTS 7,180,537 B2 * 2/2007 Ferguson ............... H04N 17/02
324/76.33
7,810,537 B2 * 10/2010 Mayle ................... B29B 13/025
156/497

(Continued)

FOREIGN PATENT DOCUMENTS

CN  102045121 A  5/2011
CN  102137414 A  7/2011
(Continued)

OTHER PUBLICATIONS

Author Unknown, Wikipedia entry: Cross-correlation, pp. 1-6, as retrieved from the internet archive, www.archive.org, on Nov. 1, 2013.*

(Continued)

*Primary Examiner* — Christopher Crutchfield
(74) *Attorney, Agent, or Firm* — Harness, Dickey & Pierce, P.L.C.

(57) ABSTRACT

A method and a system for measuring an audio transmission delay are provided. Synchronization operation is performed on transmission of an original audio codebook to be tested between a transmitter and a receiver. A transmitter starts sending the original audio codebook to be tested to a receiver in response to sending start instruction information, and stops sending the original audio codebook to the receiver in response to sending end instruction information. The receiver starts capturing the original audio codebook from the transmitter in response to receiving start instruction information and stops capturing the original audio codebook from the transmitter in response to receiving end instruction (Continued)

information. The audio transmission delay is obtained based on a test audio codebook captured by the receiver and the original audio codebook pre-stored in the receiver.

12 Claims, 10 Drawing Sheets

(51) Int. Cl.
*H04L 29/06* (2006.01)
*H04B 17/364* (2015.01)
*H04L 7/00* (2006.01)

(52) U.S. Cl.
CPC ............ *H04L 7/0091* (2013.01); *H04L 43/16* (2013.01); *H04L 65/10* (2013.01); *H04L 65/607* (2013.01); *H04M 7/006* (2013.01); *H04M 7/0081* (2013.01); *H04L 43/50* (2013.01)

(56) References Cited

U.S. PATENT DOCUMENTS

| | | | | |
|---|---|---|---|---|
| 2002/0193999 | A1* | 12/2002 | Keane | .................. H04M 7/006 704/270 |
| 2004/0215448 | A1* | 10/2004 | Funatsu | .................. G10L 25/69 704/201 |
| 2006/0203729 | A1* | 9/2006 | Deshpande | ........... H04L 1/1825 370/235 |
| 2007/0297351 | A1* | 12/2007 | Trainin | ................... H04L 12/66 370/260 |
| 2011/0043640 | A1* | 2/2011 | Zinevich | ................... G01S 5/06 348/192 |
| 2011/0090799 | A1* | 4/2011 | El-Hassan | ........... H04L 12/2697 370/241 |
| 2011/0242522 | A1* | 10/2011 | Etkin | ...................... H04L 41/12 356/5.01 |
| 2013/0120652 | A1 | 5/2013 | Wang | |

FOREIGN PATENT DOCUMENTS

| | | |
|---|---|---|
| CN | 102325059 A | 1/2012 |
| CN | 104125022 A | 10/2014 |

OTHER PUBLICATIONS

Author Unknown, RTP Audio Video Profile, as archived at www.wikipedia.org on Dec. 30, 2013, pp. 1-7.*

International Search Report and Written Opinion of the ISA for PCT/CN2014/092198, ISA/CN, Haidian District, Beijing, mailed Feb. 17, 2015.

* cited by examiner

METHOD AND SYSTEM FOR MEASURING AUDIO TRANSMISSION DELAY

This application is a national phase of International Application No. PCT/CN2014/092198, titled "METHOD AND SYSTEM FOR MEASURING AUDIO TRANSMISSION DELAY", filed on Nov. 25, 2014, which claims priority to Chinese Patent Application No. 201310616487.1 titled "METHOD AND SYSTEM FOR MEASURING AUDIO TRANSMISSION DELAY" and filed with the Chinese State Intellectual Property Office on Nov. 27, 2013, both of which are incorporated herein by reference in their entirety.

FIELD

The present disclosure relates to the field of communications, and in particular to a method and a system for measuring an audio transmission delay.

BACKGROUND

Delay is a critical factor in voice communications, and an end-to-end delay is a delay in the entire process in which a voice is captured, pre-processed, coded, packed, transmitted through a network, unpacked and played finally. Since a large delay can affect the subjective auditory experience of audience for a voice product, it is necessary to measure and evaluate a delay of a voice system. Some current methods for measuring a delay are invasive, and some are non-invasive.

An invasive measurement is conducted inside a voice system under test, and some features of an invasive system are described as follows.

First, since measuring data is generally transmitted together with data frames or data packets of a system under test, which will inevitably undergo processes, such as, compression coding, packaging, unpackaging and decoding. The measuring data may be lost or damaged in the processes of compression coding and decompressing.

Second, since the data format, the packaging format, and algorithms of compression coding and decoding of the system under test may not be public, it is difficult for testers to design matching measuring methods and measuring signals.

Besides, tool software for measurement may be required to be run on terminals of the system under test in some invasive measuring methods and timing is performed with the tool software, which may affect normal operation of the terminals of the system under test.

Most current non-invasive measuring systems are based on delay measuring methods of single-end requesting and bidirectional averaging.

The measuring method shown in FIG. 1 is a single-end capturing and bidirectional transmitting and averaging based method for measuring a delay, which mainly includes the following steps: (1) playing an audio signal locally, capturing, by a local measuring apparatus, the audio signal and recording a time stamp T1 for the capturing, (2) simultaneously capturing, by a local section of a system under test, the audio signal, which is thereafter transmitted to a remote terminal of the system under test through the system under test for playing, (3) capturing, by the remote terminal of the system under test, the sound played by the remote terminal of the system under test, which is thereafter transmitted to the local section of the system under test through an intermediate network for playing, (4) capturing, by the measuring apparatus, the signal played by the local section of the system under test and recording a time stamp T2 for the capturing, calculating a difference between the time stamps of the audio signals captured by the measuring apparatus in twice and dividing (T2−T1) by 2 to obtain a delay.

The feature of the solution above is that bidirectional transmission is performed to obtain time stamps of two captured signals and a difference between the time stamps is calculated to obtain an estimated value of a one-way delay, which, however, has the following disadvantages.

First, in the process of bidirectional transmission, since there is an audio playing device and an audio capturing device at each of the two sides, echoes (direct echoes and indirect echoes) are inevitably generated in this scenario. The existence of the echoes (especially indirect echoes) may exert interference on the calculation result of the delay, causes the calculation of the delay to be complex and seriously affects the accuracy of the calculation of the delay.

Second, in the process of bidirectional transmitting and averaging above, an end-to-end delay is the entire delay from capturing a voice to playing the voice in a single communications link. The system under test is a black box, and upload and download links in most communications are not completely symmetric. Processes the voice undergoes in the communications link and in the subsequent test device may not be the same. Thereby, the delay of the voice in the single communications link is not the same as the arithmetic average of delays in two links.

No effective solution to the problems above is provided currently.

SUMMARY

A method and a system for measuring an audio transmission delay are provided according to the present disclosure, to at least solve the technical problem that an audio transmission delay can not be calculated accurately in conventional technology.

In an aspect of the present disclosure, a method for measuring an audio transmission delay is provided, which includes: performing synchronization operation on transmission of an original audio codebook to be tested between a transmitter and a receiver, to obtain sending start instruction information, sending end instruction information, receiving start instruction information and receiving end instruction information of the original audio codebook; starting, by the transmitter, sending the original audio codebook to be tested to the receiver in response to the sending start instruction information, stopping, by the transmitter, sending the original audio codebook to the receiver in response to the sending end instruction information, starting, by the receiver, capturing the original audio codebook from the transmitter in response to the receiving start instruction information and stopping, by the receiver, capturing the original audio codebook from the transmitter in response to the receiving end instruction information; and obtaining the audio transmission delay based on a test audio codebook captured by the receiver and the original audio codebook pre-stored in the receiver.

Optionally, in the method, the sending start instruction information includes sending start time, the sending end instruction information includes sending end time, the receiving start instruction information includes receiving start time and the receiving end instruction information includes receiving end time; starting, by the transmitter, sending the original audio codebook to be tested to the receiver in response to the sending start instruction information includes starting, by the transmitter, sending the original audio codebook to the receiver at the sending start time; stopping, by the transmitter, sending the original audio codebook to the receiver in response to the sending end instruction information includes stopping, by the transmitter, sending the original audio codebook to the receiver at the sending end time; starting, by the receiver, capturing the original audio codebook from the transmitter in response to the receiving start instruction information includes starting, by the receiver, capturing the original audio codebook from the transmitter at the receiving start time; and stopping, by the receiver, capturing the original audio codebook from the transmitter in response to the receiving end instruction information includes stopping, by the receiver, capturing the original audio codebook from the transmitter at the receiving end time.

Optionally, in the method, the sending start time is the same as the receiving start time, and the sending end time is the same as the receiving end time; the sending start time is the same as the receiving start time, and a difference between the sending end time and the receiving end time is smaller than a first predetermined threshold; a difference between the sending start time and the receiving start time is smaller than a second predetermined threshold, and the sending end time is the same as the receiving end time; or the difference between the sending start time and the receiving start time is smaller than a third predetermined threshold, and the difference between the sending end time and the receiving end time is smaller than a fourth predetermined threshold.

Optionally, performing synchronization operation on transmission of the original audio codebook between the transmitter and the receiver further includes: performing information interaction between the transmitter and the receiver, so that an order in which the transmitter sends multiple original audio codebooks is the same as an order in which the receiver receives the multiple original audio codebooks.

Optionally, performing synchronization operation on transmission of the original audio codebook to be tested between the transmitter and the receiver includes: performing synchronization operation on transmission of the original audio codebook between the transmitter and the receiver by a first GPS synchronization control unit arranged in the transmitter and a second GPS synchronization control unit arranged in the receiver, where each of the first GPS synchronization control unit and the second GPS synchronization control unit includes a GPS device which includes a GPS antenna and a GPS receiving module, where the GPS antenna is configured to transmit at least one of the sending start time, the sending end time, the receiving start time and the receiving end time and the GPS receiving module is configured to receive at least one of the sending start time, the sending end time, the receiving start time and the receiving end time.

Optionally, in the method, the sending start instruction information includes first instruction information for instructing the receiver to be prepared for receiving, the sending end instruction information includes second instruction information for instructing an end of playing of the original audio codebook, the receiving start instruction information includes third instruction information for instructing the receiver to start receiving, and the receiving end instruction information includes capturing duration carried in the second instruction information; starting, by the transmitter, sending the original audio codebook to be tested to the receiver in response to the sending start instruction information includes starting, by the transmitter, sending the original audio codebook to the receiver when receiving the first instruction information; stopping, by the transmitter, sending the original audio codebook to the receiver in response to the sending end instruction information includes stopping, by the transmitter, sending the original audio codebook to the receiver when receiving the second instruction information; starting, by the receiver, capturing the original audio codebook from the transmitter in response to the receiving start instruction information includes starting, by the receiver, capturing the original audio codebook from the transmitter when receiving the third instruction information; and stopping, by the receiver, capturing the original audio codebook from the transmitter in response to the receiving end instruction information includes determining, by the receiver, whether duration for capturing the original audio codebook from the transmitter exceeds the capturing duration, and stopping capturing the original audio codebook from the transmitter in a case that the duration for capturing the original audio codebook from the transmitter exceeds the capturing duration.

Optionally, obtaining the audio transmission delay based on the test audio codebook captured by the receiver and the original audio codebook pre-stored in the receiver includes: $R_{xy}(\tau)$ is a value of a cross-correlation function between the original audio codebook and the test audio codebook corresponding thereto, $t_s$ is time when the receiver starts capturing the original audio codebook from the transmitter, $t_e$ is time when the receiver stops capturing the original audio codebook from the transmitter, t is time information corresponding to each sampling point, x(t) is an energy value corresponding to a sampling point at time t in the original audio codebook, $\tau$ is an offset of a sampling point in the test audio codebook used in convolution with x(t), and y(t+$\tau$) is an energy value corresponding to a sampling point at time t+$\tau$ in the test audio codebook, where the audio transmission delay is represented by a value of $\tau$ corresponding to a maximum value of the cross-correlation function.

Optionally, obtaining the audio transmission delay based on the test audio codebook captured by the receiver and the original audio codebook pre-stored in the receiver further includes:

$$\text{Delay}_i = \frac{1}{m}\sum_{k=1}^{m} \text{TestValue}(k),$$

where TestValue(k) is a delay value corresponding to the maximum value of the cross-correlation function obtained by solving an ith original audio codebook and an ith test audio codebook corresponding thereto obtained through a kth measurement of the ith original audio codebook, the delay value is a time-domain value obtained by dividing a value of $\tau$ corresponding to the maximum value of the cross-correlation function, obtained through the kth measurement by sampling rate information adopted by the receiver in the kth measurement, the sampling rate information is a sampling rate in header information of the ith original audio codebook, $\text{Delay}_i$ is an average audio transmission delay of the ith original audio codebook and m is an integer greater than or equal to 1.

Optionally, obtaining the audio transmission delay based on the test audio codebook captured by the receiver and the original audio codebook pre-stored in the receiver further includes:

$$\text{Avg\_Delay} = \frac{1}{n}\sum_{i=1}^{n}\text{Delay}_i,$$

where Avg_Delay is an average audio transmission delay of n original audio codebooks and n is an integer greater than or equal to 1.

A system for measuring an audio transmission delay is further provided in another aspect of the present disclosure, which includes: a first synchronizing unit arranged in a transmitter and a second synchronizing unit arranged in a receiver, configured to perform synchronization operation on transmission of an original audio codebook to be tested between the transmitter and the receiver, to obtain sending start instruction information, sending end instruction information, receiving start instruction information and receiving end instruction information of the original audio codebook; a first responding unit arranged in the transmitter, configured to start sending the original audio codebook to be tested to the receiver in response to the sending start instruction information; a second responding unit arranged in the transmitter, configured to stop sending the original audio codebook to the receiver in response to the sending end instruction information; a third responding unit arranged in the receiver, configured to start capturing the original audio codebook from the transmitter in response to the receiving start instruction information; a fourth responding unit arranged in the receiver, configured to stop capturing the original audio codebook from the transmitter in response to the receiving end instruction information; and a calculating unit arranged in the receiver, configure to calculate the audio transmission delay based on a captured test audio codebook and the original audio codebook pre-stored in the receiver.

Optionally, in the system, the first responding unit includes a first responding sub-module, configured to start sending the original audio codebook to the receiver at sending start time, where the sending start time is included in the sending start instruction information; the second responding unit includes a second responding sub-module, configure to stop sending the original audio codebook to the receiver at sending end time, where the sending end time is included in the sending end instruction information; the third responding unit includes a third responding sub-module, configured to start capturing the original audio codebook from the transmitter at receiving start time, where the receiving start time is included in the receiving start instruction information; and the fourth responding unit includes a fourth responding sub-module, configured to stop capturing the original audio codebook from the transmitter at receiving end time, where the receiving end time is included in the receiving end instruction information.

Optionally, in the system, the first synchronizing unit includes a first synchronizing module, and the second synchronizing unit includes a second synchronizing module, where the first synchronizing module and the second synchronizing module are configured to perform synchronization operation, to obtain one of the following results: the sending start time is the same as the receiving start time, and the sending end time is the same as the receiving end time; the sending start time is the same as the receiving start time, and a difference between the sending end time and the receiving end time is smaller than a first predetermined threshold; a difference between the sending start time and the receiving start time is smaller than a second predetermined threshold, and the sending end time is the same as the receiving end time; and the difference between the sending start time and the receiving start time is smaller than a third predetermined threshold, and the difference between the sending end time and the receiving end time is smaller than a fourth predetermined threshold.

Optionally, in the system, the first synchronizing unit includes a third synchronizing module, and the second synchronizing unit includes a fourth synchronizing module, where the third synchronizing module and the fourth synchronizing module are figured to perform information interaction between the transmitter and the receiver, so that an order in which the transmitter sends multiple original audio codebooks is the same as an order in which the receiver receives the multiple original audio codebooks.

Optionally, in the system, the first synchronizing unit includes a first GPS synchronization control unit, and the second synchronizing unit includes a second GPS synchronization control unit, where the first GPS synchronization control unit and the second GPS synchronization control unit are configured to perform synchronization operation on transmission of the original audio codebook between the transmitter and the receiver, where each of the first GPS synchronization control unit and the second GPS synchronization control unit includes a GPS device which includes a GPS antenna and a GPS receiving module, where the GPS antenna is configured to transmit at least one of the sending start time, the sending end time, the receiving start time and the receiving end time and the GPS receiving module is configured to receive at least one of the sending start time, the sending end time, the receiving start time and the receiving end time.

Optionally, in the system, the first responding unit includes a sending sub-module, configured to start sending the original audio codebook to the receiver when receiving first instruction information, where the first instruction information is used to instruct the receiver to be prepared for receiving; the second responding unit includes a terminating sub-module, configured to stop sending the original audio codebook to the receiver when receiving second instruction information, where the second instruction information is used to instruct an end of playing of the original audio codebook; the third responding unit includes a capturing sub-module, configured to start capturing the original audio codebook from the transmitter when receiving third instruction information, where the third instruction information is used to instruct the receiver to start receiving; and the fourth responding unit includes a determining sub-module, configured to determine, at the receiver, whether duration for capturing the original audio codebook from the transmitter exceeds a capturing duration and stop capturing the original audio codebook from the transmitter in a case that the duration for capturing the original audio codebook from the transmitter exceeds the capturing duration.

Optionally, the calculating unit includes a first calculating module, configured to calculate the audio transmission delay based on the following formula: where $R_{xy}(\tau)$ is a value of a cross-correlation function between the original audio codebook and the test audio codebook corresponding thereto, $t_s$ is time when the receiver starts capturing the original audio codebook from the transmitter, $t_e$ is time when the receiver stops capturing the original audio codebook from the transmitter, t is time information corresponding to each sampling point, x(t) is an energy value corresponding to a sampling point at time t in the original audio codebook, $\tau$ is an offset of a sampling point in the test audio codebook used in convolution with x(t), and y(t+$\tau$) is an energy value corresponding to a sampling point at time t+$\tau$ in the test audio codebook, where the audio transmission delay is represented by a value of $\tau$ corresponding to a maximum value of the cross-correlation function.

Optionally, the calculating unit includes a second calculating module, configured to calculate the audio transmission delay according to the following formula:

$$Delay i = \frac{1}{m}\sum_{k=1}^{m} TestValue(k),$$

where TestValue(k) is a delay value corresponding to the maximum value of the cross-correlation function obtained by solving an ith original audio codebook and an ith test audio codebook corresponding thereto obtained through a kth measurement of the ith original audio codebook, the delay value is a time-domain value obtained by dividing a value of $\tau$ corresponding to the maximum value of the cross-correlation function obtained through the kth measurement by sampling rate information adopted by the receiver in the kth measurement, the sampling rate information is a sampling rate in header information of the ith original audio codebook, Delayi is an average audio transmission delay of the ith original audio codebook and m is an integer greater than or equal to 1.

Optionally, the calculating unit includes a third calculating module, configured to calculate the audio transmission delay according to the following formula:

$$Avg\_Delay = \frac{1}{n}\sum_{i=1}^{n} Delay_i,$$

where Avg_Delay is an average audio transmission delay of n original audio codebooks and n is an integer greater than or equal to 1.

In the embodiments according to the present disclosure, the transmitter and the receiver are operated synchronously in the manner of synchronization, which achieves the objective of avoiding echoes and the asymmetry in a round-trip path, thus achieving the technical effect of accurately calculating a transmission delay and thereby solving the technical problem that an audio transmission delay can not be accurately calculated in conventional technology.

BRIEF DESCRIPTION OF THE DRAWINGS

The drawings here are provided for further understanding the present disclosure, and are a part of the application. The illustrative embodiments according to the present disclosure and descriptions thereof are intended to explain the invention, rather than be an inappropriate limit to the invention. In the drawings, FIG. 1 a schematic diagram of measuring an audio transmission delay in conventional technology.

DETAILED DESCRIPTION

Expressions and terms in the description of the embodiments according to the present disclosure are subject to the following explanations.

Technical solutions according to embodiments of the invention are described clearly and completely hereinafter in conjunction with the drawings, so that those in the art can better understand the solutions of the invention. Apparently, the described embodiments are only a few rather than all of the embodiments of the invention. Any other embodiments obtained by those skilled in the art based on the embodiments in the present disclosure without any creative work fall in the scope of the invention.

It should be noted that terms such as "first" and "second" in the specification, claims and the drawings above of the present disclosure are used to distinguish between similar objects, rather represent a specific order or a priority sequence. It is understood terms under this circumstance can be interchanged in appropriate cases, so that the described embodiments according to the present disclosure can be implemented in an order other than the order illustrated or described herein. Besides, terms "include", "have" and any variant thereof are intended to cover non-exclusive inclusion. For example, a process, method, system, product or device which includes a series of steps or units is not limited to steps or units explicitly listed, but may further include other steps or units which are not explicitly listed or inherent to the process, method, system, product or device.

First Embodiment

Figure 1:
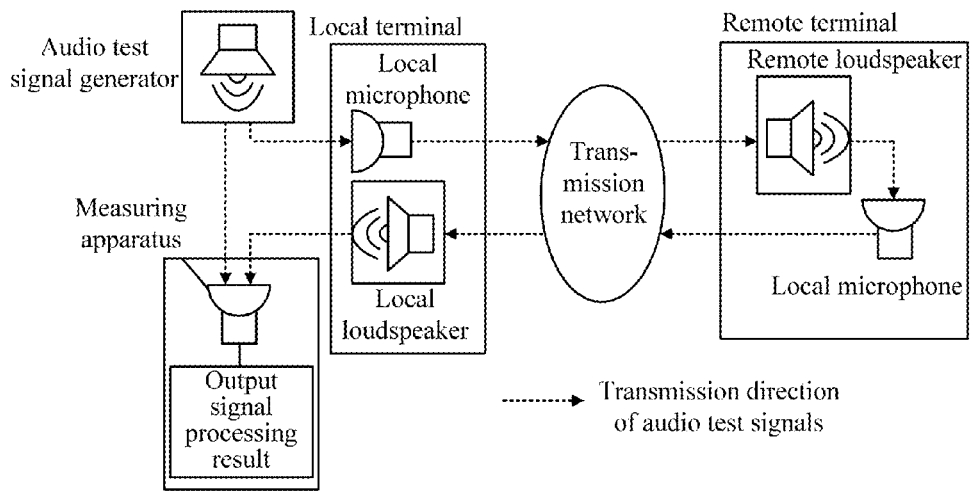
Figure 2:
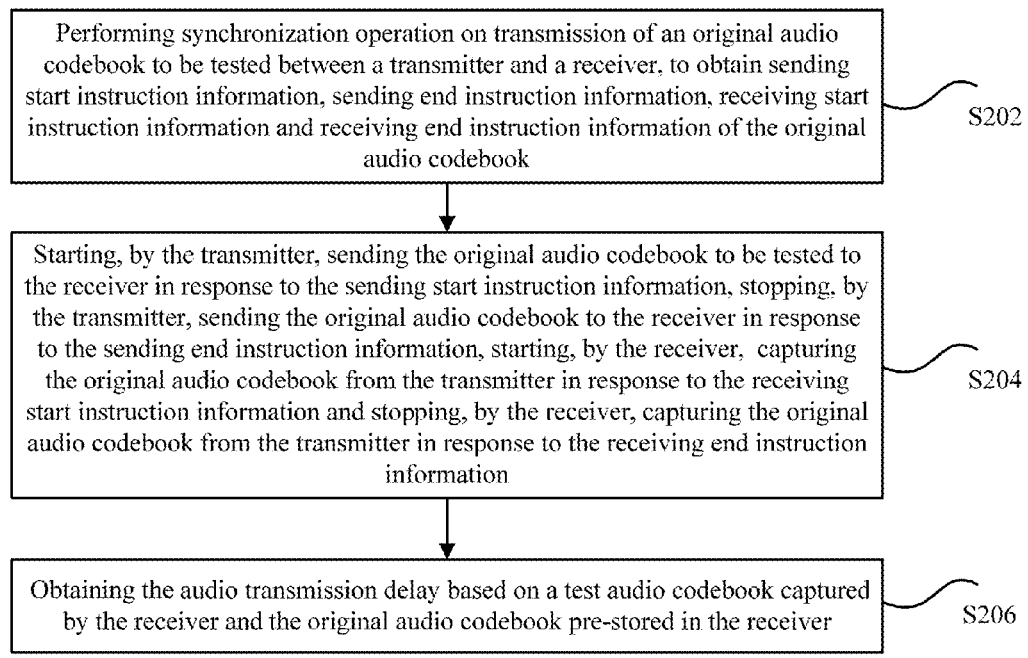
FIG. 2 is a flowchart of an optional method for measuring an audio transmission delay according to an embodiment of the invention.

A method for measuring an audio transmission delay is provided according to an embodiment of the disclosure. As shown in FIG. 1, the method includes the following steps.

At S202, synchronization operation is performed on transmission of an original audio codebook to be tested between a transmitter and a receiver, to obtain sending start instruction information, sending end instruction information, receiving start instruction information and receiving end instruction information of the original audio codebook.

Optionally, instruction information for controlling the start and the end of sending and receiving the original audio codebook is obtained by performing synchronization operation on transmission of the original audio codebook to be tested.

Optionally, an apparatus for performing synchronization operation includes but is not limited to a GPS synchronization control apparatus and a synchronization control apparatus of a signaling control server, according to an embodiment of the disclosure.

It should be noted that the synchronization operation above is performed to coordinate starting and ending of audio play at the transmitter and starting and ending of audio capture at the receiver, i.e., control the transmitter to start or stop playing the codebook and notify the receiver to start or stop capturing the audio.

Figure 3:
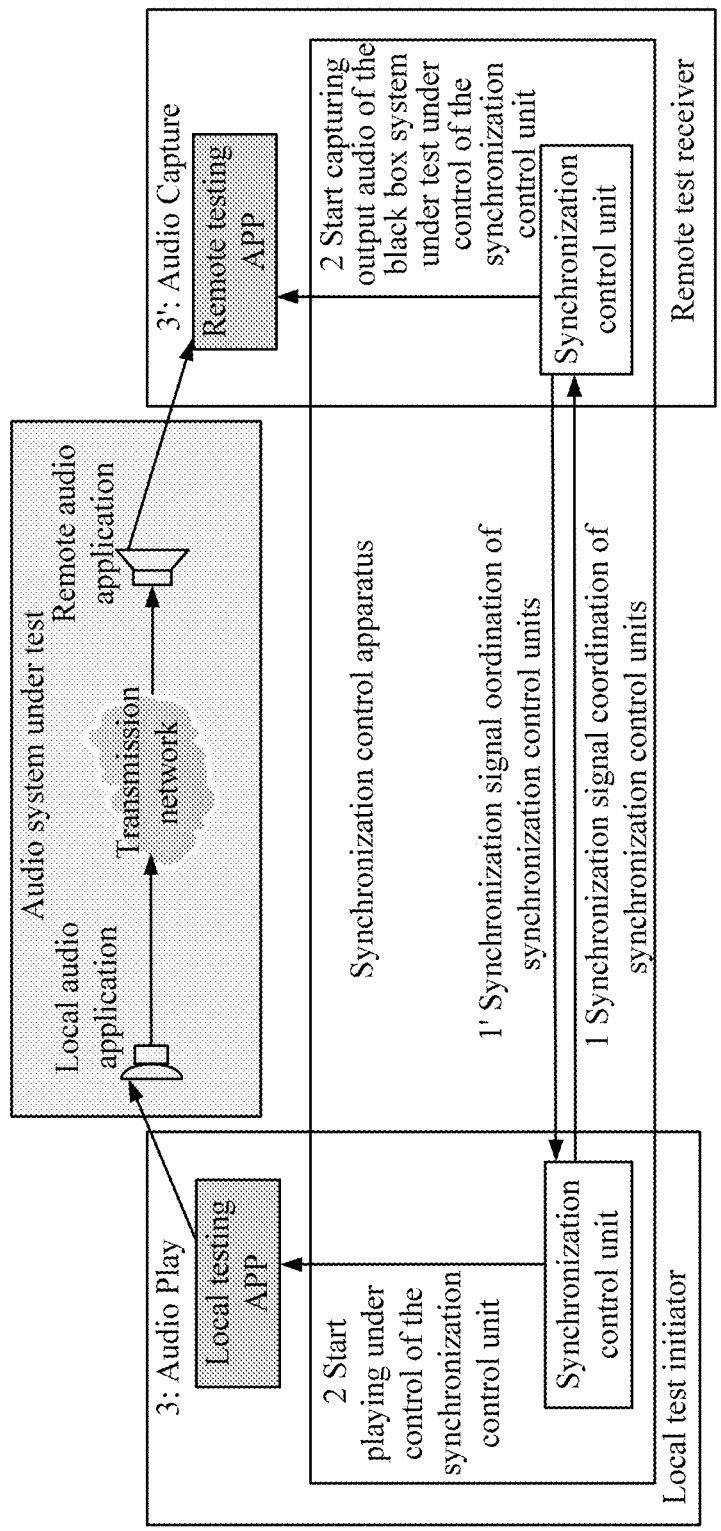
FIG. 3 is a schematic diagram of an optional implementation for measuring an audio transmission delay according to an embodiment of the invention.
Figure 4:
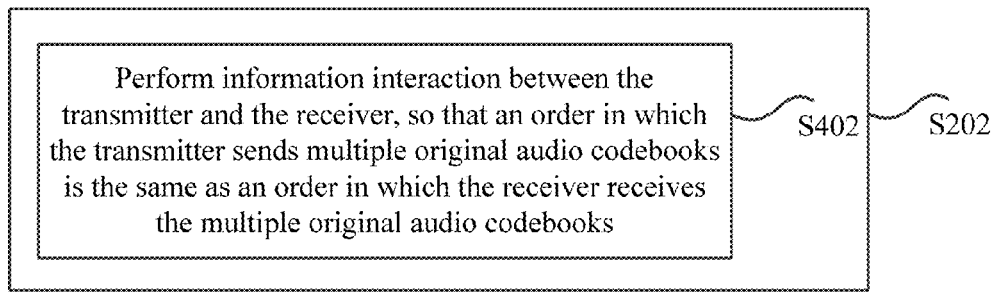
FIG. 4 is a flowchart of another optional method for measuring an audio transmission delay according to an embodiment of the invention.

For example, as shown in FIG. 3, the transmitter is a local audio application terminal, the receiver is a remote audio application terminal and the local audio application terminal transmits the original audio codebook to the remote audio application terminal through a transmission network. Synchronization operation is performed on synchronization control units at two sides, to obtain the sending start instruction information, the sending end instruction information, the receiving start instruction information and the receiving end instruction information of the original audio codebook.

At 5204, the transmitter starts sending the original audio codebook to be tested to the receiver in response to the sending start instruction information, and stops sending the original audio codebook to the receiver in response to the sending end instruction information. The receiver starts capturing the original audio codebook from the transmitter in response to the receiving start instruction information and stops capturing the original audio codebook from the transmitter in response to the receiving end instruction information.

For example, as shown in FIG. 3, the transmitter is the local audio application terminal, the receiver is the remote audio application terminal and the local audio application terminal transmits the original audio codebook to the remote audio application terminal through the transmission network. When receiving the sending start instruction information, the local audio application terminal sends the original audio codebook to be tested to the receiver. For example, the synchronization control unit controls the local audio application terminal to start playing audio (for example, Audio play). When receiving the sending end instruction information, the local audio application terminal stops sending the original audio codebook to the receiver. For example, the synchronization control unit controls the local audio application terminal to stop playing the audio. When receiving the start instruction information, the remote audio application terminal starts capturing the original audio codebook from the local audio application terminal. For example, the synchronization control unit controls to start capturing the audio played by the local audio application terminal (for example, Audio capture). When receiving the end instruction information, the remote audio application terminal stops capturing the original audio codebook from the local audio application terminal. For example, the synchronization control unit controls to stop capturing the audio played by the local audio application terminal.

At S206, the audio transmission delay is obtained based on a test audio codebook captured by the receiver and the original audio codebook pre-stored in the receiver.

For example, as shown in FIG. 3, the transmitter is the local audio application terminal, the receiver is the remote audio application terminal and the local audio application terminal transmits the original audio codebook to the remote audio application terminal through the transmission network. Comparison and estimation are performed based on the audio captured by the remote audio application terminal and the pre-stored original audio, to obtain the transmission delay of the audio.

In the embodiment according to the present disclosure, the action of sending audio by the transmitter and the action of capturing audio by the receiver are exactly synchronous, so that the original audio codebook for calculating the delay and the captured test audio codebook undergoing the transmission delay are synchronous.

Optionally, the sending start instruction information includes sending start time, the sending end instruction information includes sending end time, the receiving start instruction information includes receiving start time and the receiving end instruction information includes receiving end time.

Optionally, the transmitter starting sending the original audio codebook to be tested to the receiver in response to the sending start instruction information includes: the transmitter starting sending the original audio codebook to the receiver at the sending start time. The sending start time may include but is not limited to the time when to start playing the audio.

For example, as shown in FIG. 3, the transmitter is the local audio application terminal, the receiver is the remote audio application terminal and the local audio application terminal transmits the original audio codebook to the remote audio application terminal through the transmission network. After receiving the sending start instruction information, the local audio application terminal starts playing original audio (for example, Audio play) to the remote audio application terminal at the instructed sending start time.

Optionally, the transmitter stopping sending the original audio codebook to the receiver in response to the sending end instruction information includes: the transmitter stopping sending the original audio codebook to the receiver at the sending end time. The sending end time may include but is not limited to the time when to stop playing the audio.

For example, as shown in FIG. 3, the transmitter is the local audio application terminal, the receiver is the remote audio application terminal and the local audio application terminal transmits the original audio codebook to the remote audio application terminal through the transmission network. After receiving the sending end instruction information, the local audio application terminal stops playing the original audio to the remote audio application terminal at the instructed sending end time.

Optionally, the receiver starts capturing the original audio codebook from the transmitter in response to the receiving start instruction information includes: the receiver starting capturing the original audio codebook from the transmitter at the receiving start time. The receiving start time may include but is not limited to the time when to start capturing the audio.

For example, as shown in FIG. 3, the transmitter is the local audio application terminal, the receiver is the remote audio application terminal and the local audio application terminal transmits the original audio codebook to the remote audio application terminal through the transmission network. After receiving the receiving start instruction information, the local audio application terminal starts capturing the original audio played by the local audio application terminal at the instructed receiving start time.

The receiver stopping capturing the original audio codebook from the transmitter in response to the receiving end instruction information includes: the receiver stopping capturing the original audio codebook from the transmitter at the receiving end time. The receiving end time may include but is not limited to the time when to stop capturing the audio.

For example, as shown in FIG. 3, the transmitter is the local audio application terminal, the receiver is the remote audio application terminal and the local audio application terminal transmits the original audio codebook to the remote audio application terminal through the transmission network. After receiving the receiving end instruction information, the local audio application terminal stops capturing the original audio played by the local audio application terminal at the instructed receiving end time.

In the embodiment according to the present disclosure, with the instructions of the start times and the end times of the transmitter and the receiver, the precise synchronization between the transmitter and the receiver is achieved and the accuracy of the delay calculation is improved.

Optionally, there are four optional ways to determine the synchronization between the transmitter and the receiver in the embodiment.

A first optional determination way is that the sending start time is the same as the receiving start time and the sending end time is the same as the receiving end time.

Optionally, the start time and the end time of the transmitter are the same as those of the receiver, respectively, thereby achieving synchronous operation on the audio codebook. For example, the sending start time is $T_1$, the receiving start time is also $T_1$, the sending end time is $T_2$, and the receiving end time is also $T_2$.

A second optional determination way is that the sending start time is the same as the receiving start time and a difference between the sending end time and the receiving end time is smaller than a first predetermined threshold.

Optionally, the start times of the transmitter and the receiver are the same, and the difference between end times of the transmitter and the receiver is smaller than the first predetermined threshold, thereby achieving synchronous operation on the audio codebook. For example, the sending start time is $T_1$, the receiving start time is also $T_1$, the sending end time is $T_2$, the receiving end time is $T_3$, and $T_3-T_2<A_1$, where $A_1$ is the first predetermined threshold. It can be determined the transmitter and the receiver are synchronized.

A third optional determination way is that a difference between the sending start time and the receiving start time is smaller than a second predetermined threshold and the sending end time is the same as the receiving end time.

Optionally, the difference between start times of the transmitter and the receiver is smaller than the second predetermined threshold and the end times of the transmitter and the receiver are the same, thereby achieving synchronous operation on the original audio codebook. For example, the sending start time is $T_1$, the receiving start time is $T_4$, the sending end time is $T_2$, the receiving end time is also $T_2$ and $T_4-T_1<A_2$, where $A_2$ is the second predetermined threshold. It can be determined the transmitter and the receiver are synchronized.

A fourth optional determination way is that the difference between the sending start time and the receiving start time is smaller than a third predetermined threshold and the difference between the sending end time and the receiving end time is smaller than a fourth predetermined threshold.

Optionally, the difference between start times of the transmitter and the receiver is smaller than the third predetermined threshold, and the difference between end times of the transmitter and the receiver is smaller than the fourth predetermined threshold, thereby achieving synchronous operation on the audio codebook. For example, the sending start time is $T_1$, the receiving start time is $T_5$, the sending end time is $T_2$ and the receiving end time is $T_6$, $T_5-T_1<A_3$ and $T_6-T_2<A_4$. It can be determined the transmitter and the receiver are synchronized.

In the embodiment according to the present disclosure, it can be determined that the transmitter and the receiver are synchronized in a case that times are the same. Meanwhile, it can also be determined that the transmitter and the receiver are synchronized in a case that the difference between respective two times is within an allowable range.

Optionally, performing synchronization operation on transmission of the original audio codebook to be tested between the transmitter and the receiver further includes:

at S402, performing information interaction between the transmitter and the receiver, so that an order in which the transmitter sends multiple original audio codebooks is the same as an order in which the receiver receives the multiple original audio codebooks.

Optionally, the number of the original audio codebooks may be one or more. In a case that the number of the original audio codebooks is more than one, the order in which the transmitter sends the original audio codebooks is the same as the order in which the receiver receives the original audio codebooks.

For example, as shown in FIG. 3, the transmitter is the local audio application terminal, the receiver is the remote audio application terminal and the local audio application terminal transmits the original audio codebooks to the remote audio application terminal through the transmission network. The order in which the local audio application terminal plays audio is S1, S2, S3, the order in which the remote audio application terminal captures audio is also S1, S2, S3. Orders of the sending and the receiving are the same, so that the local audio application terminal and the remote audio application terminal can be precisely synchronized, thereby accurately calculating the transmission delay.

Optionally, performing synchronization operation on transmission of the original audio codebook to be tested between the transmitter and the receiver includes: performing synchronization operation on transmission of the original audio codebook between the transmitter and the receiver by a first GPS synchronization control unit arranged in the transmitter and a second GPS synchronization control unit arranged in the receiver.

Optionally, in the embodiment, each of the first GPS synchronization control unit and the second GPS synchronization control unit includes a GPS device which includes a GPS antenna and a GPS receiving module. The GPS antenna is configured to transmit at least one of the sending start time, the sending end time, the receiving start time and the receiving end time and the GPS receiving module is configured to receive at least one of the sending start time, the sending end time, the receiving start time and the receiving end time.

Figure 5:
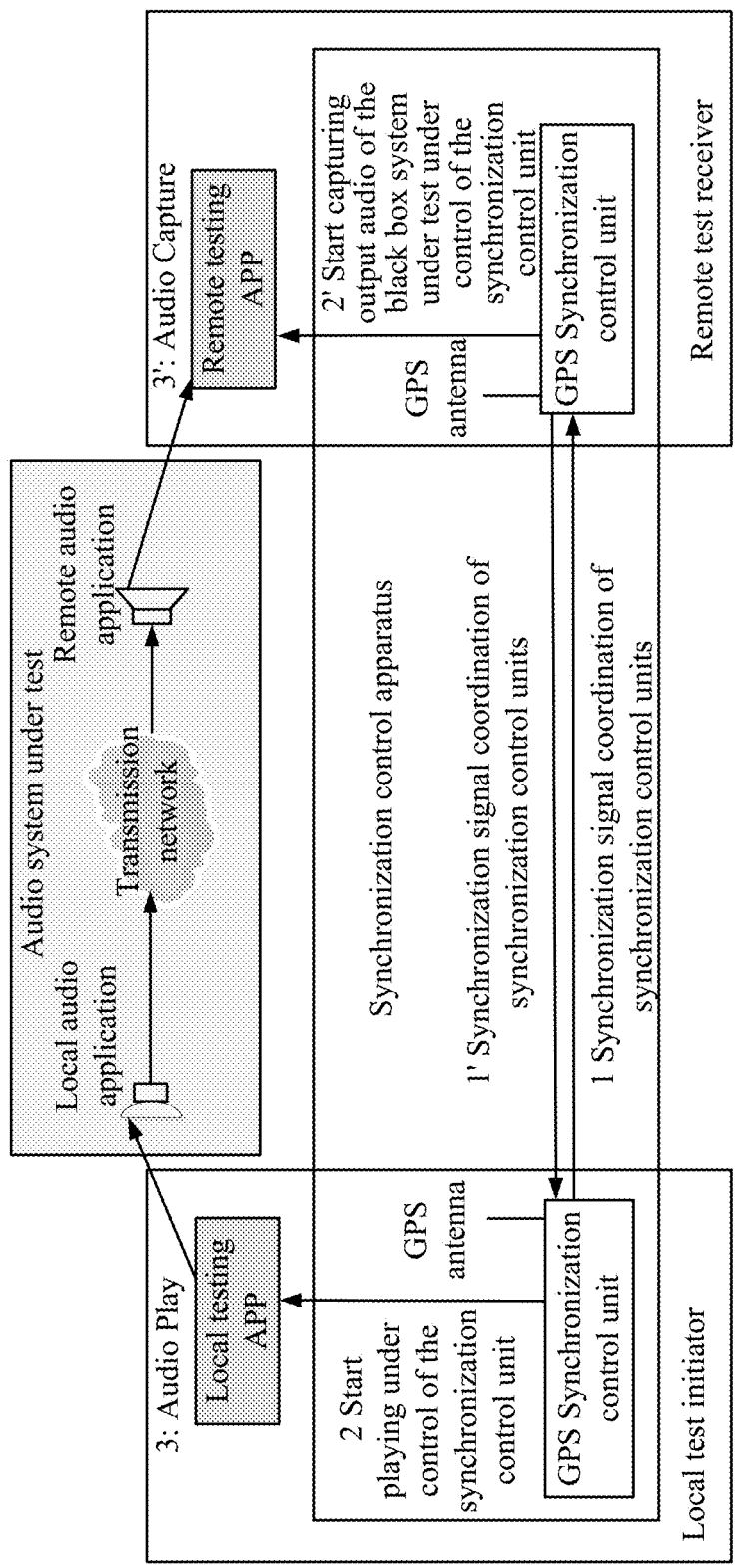
FIG. 5 is a schematic diagram of another optional implementation for measuring an audio transmission delay according to an embodiment of the invention.

For example, as shown in FIG. 5, the transmitter is the local audio application terminal, the receiver is the remote audio application terminal and the local audio application terminal transmits the original audio codebook to the remote audio application terminal through the transmission network. Synchronization control units in the two terminals are GPS synchronization control units. The local audio application terminal starts or stops playing a codebook (for example, Audio play) under the control of the GPS synchronization control unit, and the remote audio application terminal starts or stops capturing audio (for example, Audio capture) under the control of the GPS synchronization control unit.

Further, the GPS device includes the antenna and the GPS receiving module, and the received signals are decoded and processed by its hardware circuit and processing software, to extract two kinds of signals from the received signals and output the two kinds of signals. One kind is pulse signals with an interval of 1 s, and the synchronization error between leading edges thereof and the international standard Greenwich mean time is no more than 1 μs, i.e., 1 pps. The other includes international standard "year-month-day-hour-minute-second" information corresponding to pulse leading edges. The first kind of signals are called back by a GPS SDk development kit, to notify the synchronization control unit to read GPS time information, and the second kind of signals are called back by a GPS SDk development kit, to provide precise time for controlling whether to start playing and capturing corresponding audio.

Figure 6:
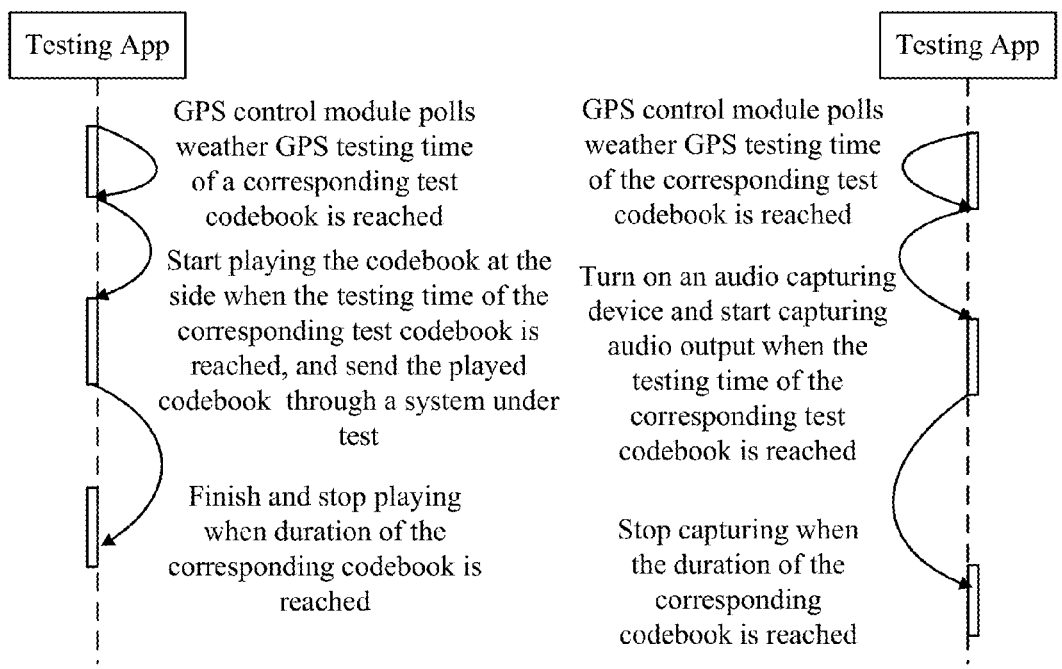
FIG. 6 is a schematic diagram of still another optional implementation for measuring an audio transmission delay according to an embodiment of the invention.

FIG. 6 shows a specific flow of synchronization processing based on a GPS synchronization control apparatus, where the local audio application terminal and the remote audio application terminal play and capture audio through testing Apps. It includes the following steps.

At S1, the local audio application terminal and the remote audio application terminal run a voice system under test, and initialize test information of each codebook, which includes a serial number of each codebook, duration of each codebook, an interval corresponding to each codebook and testing start time of each codebook.

At S2, remote sending is performed. A test initiator sends a signal to a GPS synchronization control unit based on the serial number of the codebook and reads the time provided by GPS. In a case that the time provided by the GPS device reaches the testing start time corresponding to the audio codebook, the GPS synchronization control unit sends a command to a local testing App to start playing the audio codebook which will be sent out after being processed by the system under test.

At S3, remote receiving is performed. After learning, by querying through a GPS SDK interface, that the time provided by the GPS device reaches the time for test, a GPS synchronization control unit sends a command to a testing App to turn on the remote terminal to capture the output of the audio system under test. The receiver captures the audio file at a sampling rate of an audio codebook file, which corresponds to the serial number of the audio codebook received from the transmitter and can be found in a local codebook index table, and records the audio file. The receiver continues capturing until a predetermined duration is reached, and then the receiver sends the captured test audio codebook and the original audio codebook to a delay measuring module.

In the embodiment according to the present disclosure, synchronization of sending and receiving for long-distance or short-distance is achieved based on GPS, and the problem that the accuracy of the delay is affected by the asymmetry of the paths is avoided by the one-way capture, which improves the accuracy of delay measurement.

Optionally, in the method for measuring the audio transmission delay, the sending start instruction information includes first instruction information for instructing the receiver to be prepared for receiving, the sending end instruction information includes second instruction information for instructing an end of playing of the original audio codebook, the receiving start instruction information includes third instruction information for instructing the receiver to start receiving, and the receiving end instruction information includes the capturing duration carried in the second instruction information.

Optionally, instruction information may be called signaling information in the embodiment. And the instruction information described above is transmitted based on a signaling control server (SyncServer). Optionally, synchronization of sending and receiving for the short-distance can be achieved based on the signaling control server.

Optionally, the transmitter starting sending the original audio codebook to be tested to the receiver in response to the sending start instruction information includes: the transmitter starting sending the original audio codebook to the receiver when receiving the first instruction information.

Figure 7:
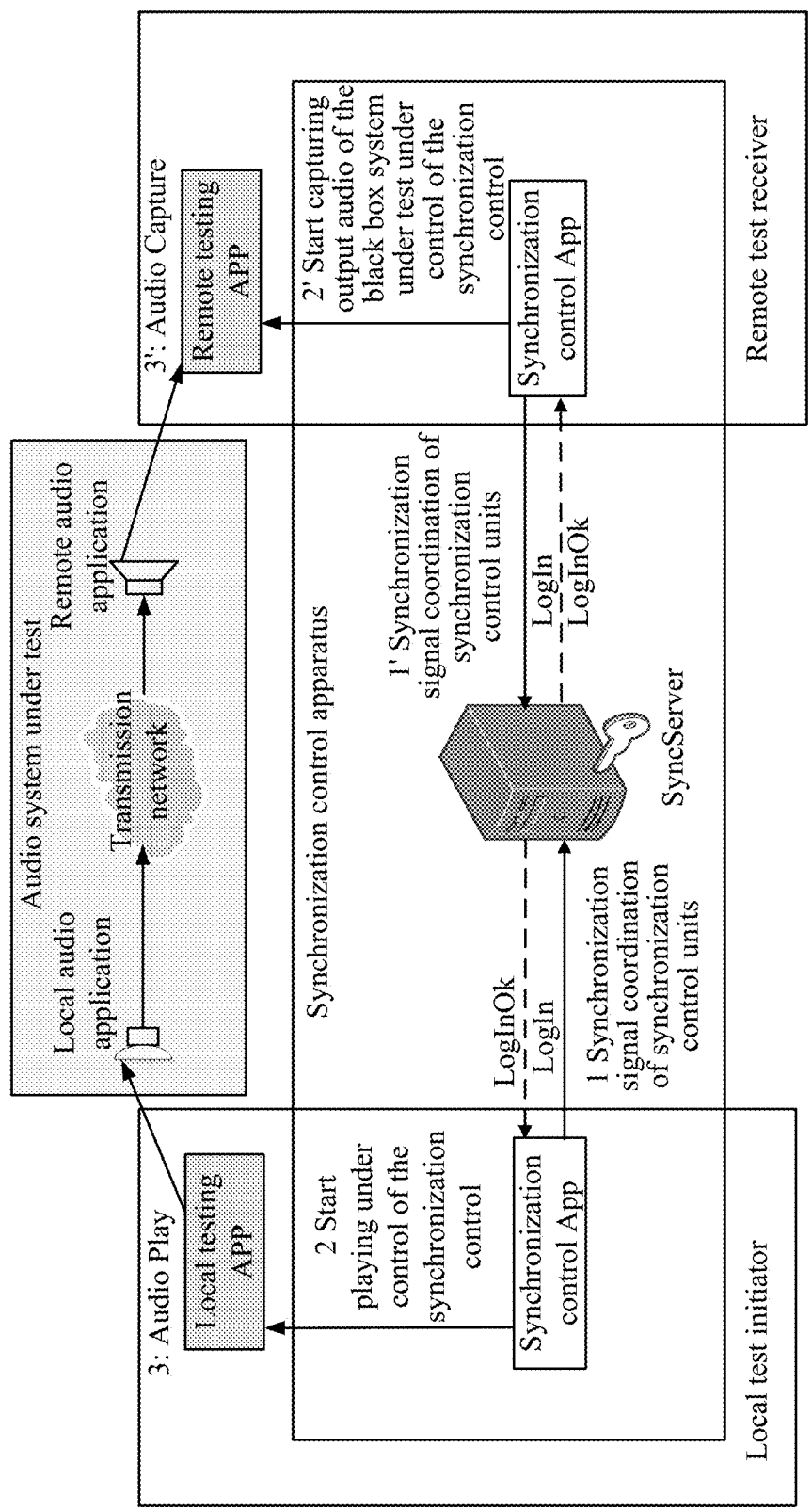
FIG. 7 is a schematic diagram of still another optional implementation for measuring an audio transmission delay according to an embodiment of the invention.

For example, as shown in FIG. 7, the transmitter is a local audio application terminal, the receiver is a remote audio application terminal and the local audio application terminal transmits the original audio codebook to the remote audio application terminal through a transmission network. When receiving the sending start instruction information, i.e., the first instruction information, the local audio application terminal instructs, according to the received first instruction information, the remote audio application terminal to be prepared for capturing audio.

Optionally, the transmitter stopping sending the original audio codebook to the receiver in response to the sending end instruction information includes: the transmitter stopping sending the original audio codebook to the receiver when receiving the second instruction information.

For example, as shown in FIG. 7, the transmitter is the local audio application terminal, the receiver is the remote audio application terminal and the local audio application terminal transmits the original audio codebook to the remote audio application terminal through the transmission network. When receiving the sending end instruction information, i.e., the second instruction information, the local audio application terminal instructs, according to the received second instruction information, the remote audio application terminal that playing of original audio is finished.

Optionally, the receiver starting capturing the original audio codebook from the transmitter in response to the receiving start instruction information includes: the receiver starting capturing the original audio codebook from the transmitter when receiving the third instruction information.

For example, as shown in FIG. 7, the transmitter is the local audio application terminal, the receiver is the remote audio application terminal and the local audio application terminal transmits the original audio codebook to the remote audio application terminal through the transmission network. When the remote audio application terminal receives the receiving start instruction information, i.e., the third instruction information, the remote audio application terminal is instructed to start capturing the original audio according to the received third instruction information.

Optionally, the receiver stopping capturing the original audio codebook from the transmitter in response to the receiving end instruction information includes: the receiver determining whether duration for capturing the original audio codebook from the transmitter exceeds the capturing duration, and stopping capturing the original audio codebook from the transmitter in a case that the duration for capturing the original audio codebook from the transmitter exceeds the capturing duration.

For example, as shown in FIG. 7, the transmitter is the local audio application terminal, the receiver is the remote audio application terminal and the local audio application terminal transmits the original audio codebook to the remote audio application terminal through the transmission network. The remote audio application terminal receives the receiving end instruction information, which includes the capturing duration $T_t$ carried in the second instruction information.

Figure 8:
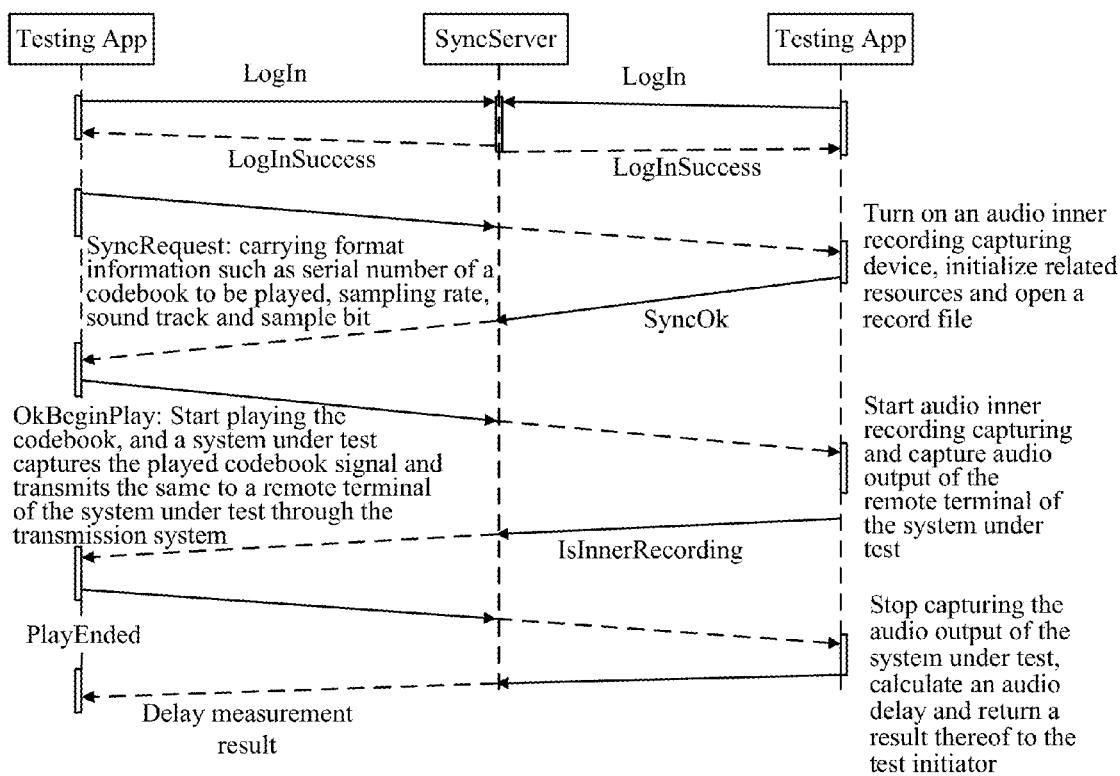
FIG. 8 is a schematic diagram of still another optional implementation for measuring an audio transmission delay according to an embodiment of the invention.

A specific flow of the instruction-controlled synchronization processing above of a synchronization control apparatus is further described in conjunction with FIG. 8. The local audio application terminal and the remote audio application terminal play and capture audio through testing Apps. It includes the following steps.

At S1, the local audio application terminal and the remote audio application terminal run a voice system under test, start synchronization test control clients and successfully log in to the SyncServer. After they both successfully log in, the SyncServer creates a testing session. Two sides of the testing session are represented by side A and side B, respectively.

At S2, any of the two sides (for example, side A) initiates an audio testing session request "SyncRequest" (the request carrying information of the serial number of the codebook), which is thereafter transferred to the other side (side B) of the testing session via a control end of the SyncServer.

At S3, the other side (side B) initializes/turns on an audio resource capturing device after receiving the testing session request "SyncRequest", creates header information such as a degraded codebook filename/an audio sampling rate and the number of sound tracks/the number of bits of a sample, according to the serial number of the codebook, to record an audio output signal of the system under test, and returns confirmation information "Sync Ok" of being prepared to the initiator (side A) of the testing session via the SyncServer.

At S4, the initiator (side A) of the testing session sends a signaling (Ok Begin Play) for starting playing an audio codebook to the other side (side B) after receiving a signaling, transferred by the SyncServer, indicating that the opposite terminal is prepared, and immediately starts playing a reference codebook signal. The played reference codebook signal is input to and captured by the audio system under test, goes through all processes thereof (pre-processing, coding, packing, transmitting through a network, unpacking, decoding, post-processing and playing) and is captured by a test control client at the other side after being played and output by the other side.

At S5, the other side (side B) immediately starts audio inner recording to capture the output of the audio system under test once receiving the signaling "Ok Begin Play", and returns a signaling (Is Inner Recording) indicating that inner recording is being performed on the output of the audio system under test to the initiator (A).

At S6, the initiator (side A) of the testing session sends a signaling "Play Ended" (carrying a duration of the test codebook) to the other side (side B) once finishing playing the reference audio codebook. After receiving the signaling, the other side determines whether the capturing duration is reached. In a case that the capturing duration is reached, the other side stops capturing the output signal of the audio system under test and outputs the recorded codebook signal.

In the embodiment according to the present disclosure, synchronization operation of the transmitter and the receiver is achieved through instruction-based synchronization control, and a one-way capturing method is used, avoiding the problem that the delay accuracy is affected by echoes and path asymmetry and improving the accuracy of delay measurement.

Optionally, obtaining the audio transmission delay based on the test audio codebook captured by the receiver and the original audio codebook pre-stored in the receiver includes:

$$R_{xy}(\tau)=\int_{ts}^{te}x(t)y(t+\tau)dt \tag{1}$$

where $R_{xy}(\tau)$ is a value of a cross-correlation function between the original audio codebook and the test audio codebook corresponding thereto, $t_s$ is the time when the receiver starts capturing the original audio codebook from the transmitter, $t_e$ is the time when the receiver stops capturing the original audio codebook from the transmitter, t is time information corresponding to each sampling point, x(t) is an energy value corresponding to a sampling point at time t in the original audio codebook, $\tau$ is an offset of a sampling point in the test audio codebook used in convolution with x(t) and y(t+$\tau$) is an energy value of a sampling point at time t+$\tau$ in the test audio codebook. The audio transmission delay is represented by the value of $\tau$ corresponding to a maximum value of the cross-correlation function.

The maximum cross-correlation function $R_{xy}(\tau)$ between the original audio codebook and the obtained test audio codebook and the value of the subscript $\tau$ corresponding thereto are solved, and an estimated delay value can be obtained by dividing the value of $\tau$ by the sampling rate information of a corresponding reference audio codebook.

Optionally, the audio delay is obtained by solving the cross-correlation between audio signals, in the delay calculation of the embodiment, and the solved audio delay includes a crude audio overall delay "Delay-crude" and an internal audio delay "Delay-internal". The crude overall delay "Delay-crude" is a delay value which is obtained based on a maximum overall cross-correlation between a reference codebook and an output audio codebook recorded by the synchronization control unit. The audio sub-segment delay "Delay-internal" is obtained as follows: after the crude overall delay is solved, audio sub-segment division and alignment is performed on the audio signal in the codebook, and then the delay between each audio sun-segment in the reference codebook and a corresponding audio sub-segment in the output audio codebook recorded by the synchronization control unit is solved. The delay value finally solved is the crude audio overall delay "Delay-crude" plus the internal audio delay "Delay-internal".

Optionally, a normalized maximum cross-correlation coefficient $\rho_{xy}(\tau)$ and a corresponding subscript time $\tau$ can be calculated after normalizing the cross-correlation function value above according to the formula:

$$\rho_{xy}(\tau) = \frac{\int_{ts}^{te} x(t)y(t+\tau)\,dt}{\sqrt{\int_{ts}^{te}[x(t)\cdot x(t)]\,dt \int_{ts}^{te}[y(t)\cdot y(t)]\,dt}}. \tag{2}$$

As to delay estimation in a scenario of an audio playing codebook with a high sampling rate ($\geq$44.1K, 48K, 96K and do on), data of one frame of codebook file may be easy to process. Thus, audio envelopes can be obtained from the codebook audio file at a small window of Tms, and a maximum cross-correlation value between the envelopes can be obtained, to obtain a corresponding delay value t, which includes the following steps.

At S1, a window is applied to a voice/audio signal at Tms.

Optionally, the applied window in the embodiment includes at least one of the following: a Hamming window, a Hann window, a hamming window, a triangle window, a Bartlett window and a Kaiser window For example, in a case that the window function is a rectangular window, which is defined by the formula:

$$w(n) = \begin{cases} 1, & 0 \le n < N \\ 0 & \end{cases}, \quad (3)$$

a kth frame of the voice signal to which a window is applied is expressed by the formula: $Xk(n)=w(n)*x(k*N+n)$. An average of energy of the kth frame of the signal, $Xk(n)$, is expressed by $E(k)$:

$$E(k) = \frac{1}{N} = \sum_{n=1}^{N-1} X_k(n) * X_k(n). \quad (4)$$

At S2, an envelope information value is obtained for every Tms frame. The envelope information is obtained by calculating a logarithm of a value obtained by normalizing a square root of the voice energy signal and represents a short-term voice energy change. The envelope of the kth frame of voice signal is expressed by Env(k):

$$Env(k) = 20 * \log 10 \left( \frac{\sqrt{\frac{1}{N} \sum_{n=1}^{N-1} X_k(n) * X_k(n)}}{32768} \right). \quad (5)$$

At S3, a maximum value of a cross-correlation function between envelops of a played codebook signal and a recorded degraded signal of the system under test and a corresponding time τ. In measuring high-quality audio, x(t) or y(t) in the cross-correlation function or the cross-correlation coefficient can be replaced with the sequence value of the envelops obtained by applying the window to the reference codebook and the test codebook, respectively, to obtain the position of a corresponding delayed sample, which can be converted into time with the sampling rate to obtain a delay value.

Optionally, obtaining the audio transmission delay based on the test audio codebook captured by the receiver and the original audio codebook pre-stored in the receiver further includes:

$$Delay_i = \frac{1}{m} \sum_{k=1}^{m} TestValue(k), \quad (6)$$

where TestValue(k) is a delay value corresponding to the maximum value of the cross-correlation function obtained by solving an ith original audio codebook and an ith test audio codebook corresponding thereto obtained through a kth measurement of the ith original audio codebook, the delay value is a time-domain value obtained by dividing a value of τ corresponding to the maximum value of the cross-correlation function obtained through the kth measurement by the sampling rate information adopted by the receiver in the kth measurement, the sampling rate information is a sampling rate in header information of the ith original audio codebook, $Delay_i$, is an average audio transmission delay of the ith original audio codebook and m is an integer greater than or equal to 1.

Optionally, obtaining the audio transmission delay based on the test audio codebook captured by the receiver and the original audio codebook pre-stored in the receiver further includes obtaining an average overall delay of the audio system:

$$Avg\_Delay = \frac{1}{n} \sum_{i=1}^{n} Delay_i, \quad (7)$$

where Avg_Delay is the average audio transmission delay of n original audio codebooks and n is an integer greater than or equal to 1.

In the embodiment according to the present disclosure, energy values of sampling points are calculated based on the cross-correlation function, thereby achieving accurate calculation of the audio transmission delay.

It should be noted that the foregoing method embodiments each are described as a combination of a series of actions for ease of description. Those in the art shall understand the invention is not limited by the described order of the actions, for some steps may be performed in other orders or simultaneously according to the present disclosure. Besides, those in the art shall also understand the embodiments described in the specification are preferred embodiments, and the actions and modules involved are not surely necessary for the invention.

According to the descriptions of the embodiment above, those in the art can clearly understand that the methods according to the embodiments described above may be implemented through software in combination with a necessary universal hardware platform, or through hardware, and in many cases the former makes a better implementation. Based on such understanding, the essence or the part contributing to conventional technology of the technical solutions according to the present disclosure may be embodied in the form of a computer software product. The computer software product is stored in a storage medium (such as a ROM/RAM, a magnetic disk or an optical disc), and includes instructions to enable a terminal device (such as, a cellphone, a computer, a server or a network device) to perform the method according to each of the embodiments in the present disclosure.

Second Embodiment

Figure 9:
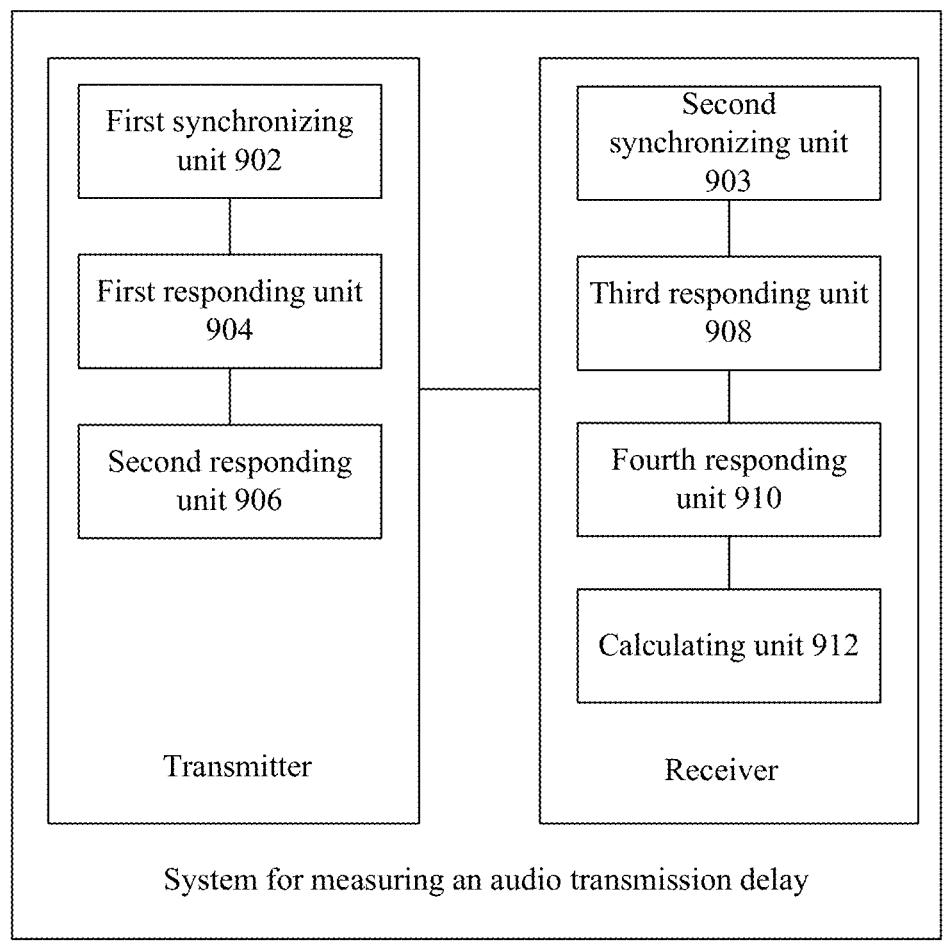
FIG. 9 is a schematic diagram of an optional apparatus for measuring an audio transmission delay according to an embodiment of the invention.

A system for performing the method above for measuring an audio transmission delay is further provided according an embodiment of the disclosure. As shown in FIG. 9, the system is as follows.

1) A first synchronizing unit 902 arranged in the transmitter and a second synchronizing unit 903 arranged in the receiver are configured to perform synchronization operation on transmission of an original audio codebook to be tested between the transmitter and the receiver, to obtain sending start instruction information, sending end instruction information, receiving start instruction information and receiving end instruction information of the original audio codebook.

Optionally, instruction information for controlling the start and the end of sending and receiving the original audio codebook is obtained by performing synchronization operation on transmission of the original audio codebook to be tested.

Optionally, an apparatus for performing synchronization operation includes but is not limited to a GPS synchronization control apparatus and a synchronization control apparatus of a signaling control server, according to an embodiment of the disclosure.

It should be noted that the synchronization operation above is performed to coordinate starting and ending of audio playing at the transmitter and starting and ending of audio capture at the receiver, i.e., control the transmitter to start or stop playing the codebook and notify the receiver to start or stop capturing the audio.

For example, as shown in FIG. 3, the transmitter is a local audio application terminal, the receiver is a remote audio application terminal and the local audio application terminal transmits the original audio codebook to the remote audio application terminal through a transmission network. The synchronization operation is performed on synchronization control units at both sides, to obtain the sending start instruction information, the sending end instruction information, the receiving start instruction information and the receiving end instruction information of the original audio codebook.

2) A first responding unit 904 arranged in the transmitter is configured to start sending the original audio codebook to be tested to the receiver in response to the sending start instruction information.

For example, as shown in FIG. 3, the transmitter is the local audio application terminal, the receiver is the remote audio application terminal and the local audio application terminal transmits the original audio codebook to the remote audio application terminal through the transmission network. When receiving the sending start instruction information, the local audio application terminal sends the original audio codebook to be tested to the receiver. For example, the synchronization control unit controls the local audio application terminal to start playing audio (for example, Audio play).

3) A second responding unit 906 arranged in the transmitter is configured to stop sending the original audio codebook to the receiver in response to the sending end instruction information.

For example, as shown in FIG. 3, the transmitter is the local audio application terminal, the receiver is the remote audio application terminal and the local audio application terminal transmits the original audio codebook to the remote audio application terminal through the transmission network. When receiving the sending end instruction information, the local audio application terminal stops sending the original audio codebook to the receiver. For example, the synchronization control unit controls the local audio application terminal to stop playing the audio.

4) A third responding unit 908 arranged in the receiver is configured to start capturing the original audio codebook from the transmitter in response to the receiving start instruction information.

For example, as shown in FIG. 3, the transmitter is the local audio application terminal, the receiver is the remote audio application terminal and the local audio application terminal transmits the original audio codebook to the remote audio application terminal through the transmission network. When receiving the start instruction information, the remote audio application terminal starts capturing the original audio codebook from the local audio application terminal. For example, the synchronization control unit controls to start capturing the audio played by the local audio application terminal (for example, Audio capture).

5) A fourth responding unit 910 arranged in the receiver is configured to stop capturing the original audio codebook from the transmitter in response to the receiving end instruction information.

For example, as shown in FIG. 3, the transmitter is the local audio application terminal, the receiver is the remote audio application terminal and the local audio application terminal transmits the original audio codebook to the remote audio application terminal through the transmission network. When receiving the end instruction information, the remote audio application terminal stops capturing the original audio codebook from the local audio application terminal. For example, the synchronization control unit controls to stop capturing the audio played by the local audio application terminal.

6) A calculating unit 912 arranged in the receiver is configured to calculate an audio transmission delay based on a test audio codebook captured by the receiver and the original audio codebook pre-stored in the receiver.

For example, as shown in FIG. 3, the transmitter is the local audio application terminal, the receiver is the remote audio application terminal and the local audio application terminal transmits the original audio codebook to the remote audio application terminal through the transmission network. Comparison and estimation are performed based on the audio captured by the remote audio application terminal and the pre-stored original audio, to obtain the transmission delay of the audio.

In the embodiment according to the present disclosure, the action of sending audio by the transmitter and the action of capturing audio by the receiver are exactly synchronous, so that the original audio codebook for calculating the delay and the captured audio codebook undergoing the transmission delay are synchronous.

Figure 10:
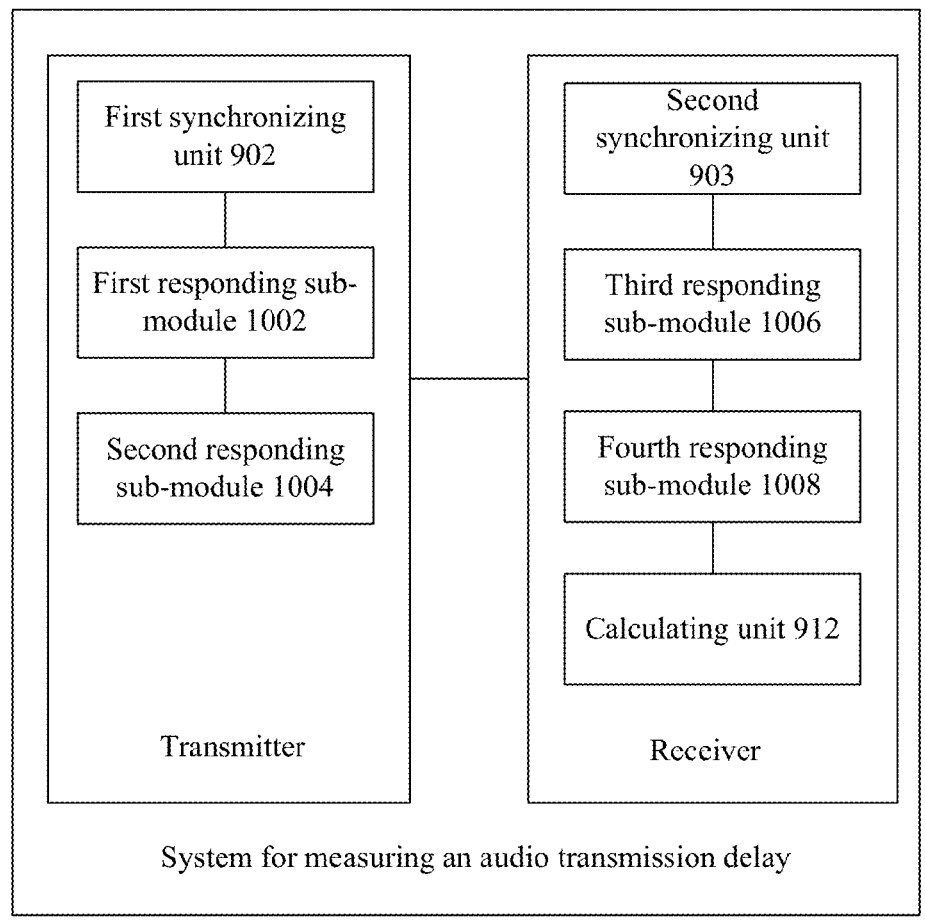
FIG. 10 is a schematic diagram of another optional apparatus for measuring an audio transmission delay according to an embodiment of the invention.

Optionally, as shown in FIG. 10, the system is described further as follows.

1) The first responding unit 904 includes a first responding sub-module 1002, configured to start sending the original audio codebook to the receiver at sending start time. The sending start time is included in the sending start instruction information.

Optionally, the sending start time may include but is not limited to the time when to start playing the audio.

For example, as shown in FIG. 3, the transmitter is the local audio application terminal, the receiver is the remote audio application terminal and the local audio application terminal transmits the original audio codebook to the remote audio application terminal through the transmission network. After receiving the sending start instruction information, the local audio application terminal starts playing original audio to the remote audio application terminal at the instructed sending start time (for example, Audio play).

2) The second responding unit 906 includes a second responding sub-module 1004, configure to stop sending the original audio codebook to the receiver at sending end time. The sending end time is included in the sending end instruction information.

Optionally, the sending end time may include but is not limited to the time when to stop playing the audio.

For example, as shown in FIG. 3, the transmitter is the local audio application terminal, the receiver is the remote audio application terminal and the local audio application terminal transmits the original audio codebook to the remote audio application terminal through the transmission network. After receiving the sending end instruction information, the local audio application terminal stops playing the original audio to the remote audio application terminal at the instructed sending end time.

3) The third responding unit 908 includes a third responding sub-module 1006, configured to start capturing the original audio codebook from the transmitter at a receiving start time. The receiving start time is included in the receiving start instruction information.

Optionally, the receiving start time may include but is not limited to the time when to start capturing the audio.

For example, as shown in FIG. 3, the transmitter is the local audio application terminal, the receiver is the remote audio application terminal and the local audio application terminal transmits the original audio codebook to the remote audio application terminal through the transmission network. After receiving the receiving start instruction information, the local audio application terminal starts capturing the original audio played by the local audio application terminal at the instructed receiving start time.

4) The fourth responding unit 910 includes a fourth responding sub-module 1008, configured to stop capturing the original audio codebook from the transmitter at receiving end time. The receiving end time is included in the receiving end instruction information.

Optionally, the receiving end time may include but is not limited to the time when to stop capturing the audio.

For example, as shown in FIG. 3, the transmitter is the local audio application terminal, the receiver is the remote audio application terminal and the local audio application terminal transmits the original audio codebook to the remote audio application terminal through the transmission network. After receiving the receiving end instruction information, the local audio application terminal stops capturing the original audio played by the local audio application terminal at the instructed receiving end time.

In the embodiment according to the present disclosure, with the instructions of the start times and the end times of the transmitter and the receiver, the precise synchronization between the transmitter and the receiver is achieved and the accuracy of the delay calculation is improved.

Figure 11:
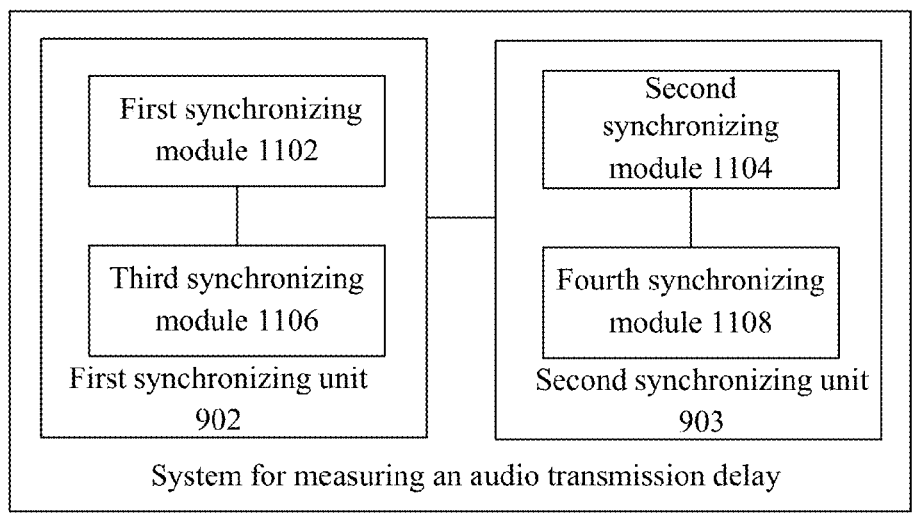
FIG. 11 is a schematic diagram of still another optional apparatus for measuring an audio transmission delay according to an embodiment of the invention.

Optionally, as shown in FIG. 11, in the system, the first synchronizing unit 902 includes a first synchronizing module 1102, and the second synchronizing unit 903 includes a second synchronizing module 1104, where the first synchronizing module 1102 and the second synchronizing module 1104 are configured to perform synchronization operation, to obtain one of the following optional results.

Optionally, the start time and the end time of the transmitter are the same as those of the receiver, respectively, thereby achieving synchronous operation on the audio codebook. For example, the sending start time is $T_1$, the receiving start time is also $T_1$, the sending end time is $T_2$, and the receiving end time is also $T_2$.

Optionally, the start times of the transmitter and the receiver are the same, and the difference between end times of the transmitter and the receiver is smaller than a first predetermined threshold, thereby achieving synchronous operation on the original audio codebook. For example, the sending start time is $T_1$, the receiving start time is also $T_1$, the sending end time is $T_2$, the receiving end time is $T_3$, and $T_3-T_2<A_1$, where $A_1$ is the first predetermined threshold. It can be determined the transmitter and the receiver are synchronized.

Optionally, the difference between start times of the transmitter and the receiver is smaller than a second predetermined threshold and the end times of the transmitter and the receiver are the same, thereby achieving synchronous operation on the original audio codebook. For example, the sending start time is $T_1$, the receiving start time is $T_4$, the sending end time is $T_2$, the receiving end time is also $T_2$ and $T_4-T_1<A_2$, where $A_2$ is the second predetermined threshold. It can be determined the transmitter and the receiver are synchronized.

Optionally, the difference between start times of the transmitter and the receiver is smaller than a third predetermined threshold, and the difference between end times of the transmitter and the receiver is smaller than a fourth predetermined threshold, thereby achieving synchronous operation on the audio codebook. For example, the sending start time is $T_1$, the receiving start time is $T_5$, the sending end time is $T_2$ and the receiving end time is $T_6$, $T_5-T_1<A_3$ and $T_6-T_2<A_4$. It can be determined the transmitter and the receiver are synchronized.

In the embodiment according to the present disclosure, it can be determined the transmitter and the receiver are synchronized in a case that times are the same. Meanwhile, it can also be determined that the transmitter and the receiver are synchronized in a case that the difference between respective two times is within an allowable range.

Optionally, as shown in FIG. 11, the first synchronizing unit 902 includes further a third synchronizing module 1106, and the second synchronizing unit 903 includes a fourth synchronizing module 1108, where the third synchronizing module 1106 and the fourth synchronizing module 1108 are configured to perform information interaction between the transmitter and the receiver, so that an order in which the transmitter sends multiple original audio codebooks is the same as an order in which the receiver receives the multiple original audio codebooks.

Optionally, the number of the original audio codebooks may be one or more. In a case that the number of the original audio codebooks is more than one, the order in which the transmitter sends the original audio codebooks is the same as the order in which the receiver receives the original audio codebooks.

For example, as shown in FIG. 3, the transmitter is the local audio application terminal, the receiver is the remote audio application terminal and the local audio application terminal transmits the original audio codebooks to the remote audio application terminal through the transmission network. The order in which the local audio application terminal plays audio is S1, S2, S3, the order in which the remote audio application terminal captures audio is also S1, S2, S3. Orders for sending and receiving are the same, so that the local audio application terminal and the remote audio application terminal can be precisely synchronized, thereby accurately calculating the transmission delay.

Figure 12:
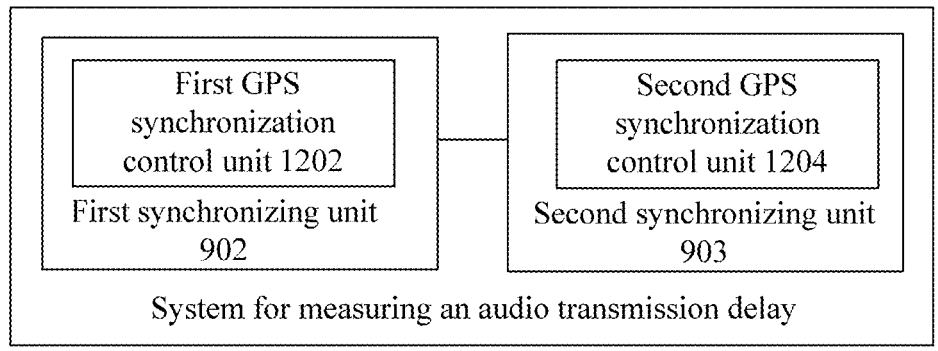
FIG. 12 is a schematic diagram of still another optional apparatus for measuring an audio transmission delay according to an embodiment of the invention.

Optionally, as shown in FIG. 12, the first synchronizing unit 902 includes a first GPS synchronization control unit 1202, and the second synchronizing unit 903 includes a second GPS synchronization control unit 1204, where the first GPS synchronization control unit 1202 and the second GPS synchronization control unit 1204 are configured to perform synchronization operation on transmission of the original audio codebooks between the transmitter and the receiver.

Optionally, in the embodiment, each of the first GPS synchronization control unit and the second GPS synchronization control unit includes a GPS device which includes a GPS antenna and a GPS receiving module. The GPS antenna is configured to transmit at least one of the sending start time, the sending end time, the receiving start time and the receiving end time and the GPS receiving module is configured to receive at least one of the sending start time, the sending end time, the receiving start time and the receiving end time.

For example, as shown in FIG. 5, the transmitter is the local audio application terminal, the receiver is the remote audio application terminal and the local audio application terminal transmits the original audio codebook to the remote audio application terminal through the transmission network. Synchronization control units in the two terminals are GPS synchronization control units. The local audio application terminal starts or stops playing a codebook (for example, Audio play) under the control of the GPS synchronization control unit, and the remote audio application terminal starts or stops capturing audio (for example, Audio capture) under the control of the GPS synchronization control unit.

Further, the GPS device includes the antenna and the GPS receiving module, and the received signals are decoded and processed by its hardware circuit and processing software, to extract two kinds of signals from the received signals and output the two kinds of signals. One kind is pulse signals with an interval of 1 s, and the synchronization error between leading edges thereof and the international standard Greenwich mean time is no more than 1 µs, i.e., 1 pps. The other includes international standard "year-month-day-hour-minute-second" information corresponding to pulse leading edges. The first kind of signals are called back by a GPS SDk development kit, to notify the synchronization control unit to read GPS time information, and the second kind of signals are called back by a GPS SDk development kit, to provide precise time for controlling whether to start playing and capturing corresponding audio.

FIG. 6 shows a specific flow of synchronization processing based on a GPS synchronization control apparatus, where the local audio application terminal and the remote audio application terminal play and capture audio through testing Apps. It includes the following steps.

At S1, the local audio application terminal and the remote audio application terminal run a voice system under test, and initialize test information of each codebook, which includes a serial number of each codebook (a codebook here is a voice/audio file with audio header format information, where the header format information includes a sampling rate, the number of sound tracks and the number of bits of a sample, where the format of the voice/audio file may be an format with an audio header, such as way, mp3, wma and so on), duration of each codebook, an interval corresponding to each codebook and testing start time of each codebook.

At S2, remote sending is performed. A test initiator sends a signal to a GPS synchronization control unit based on the serial number of the codebook and reads the time provided by GPS. In a case that the time provided by the GPS device reaches the testing start time corresponding to the audio codebook, the GPS synchronization control unit sends a command to a local testing App to start playing the audio codebook which will be sent out after being processed by the system under test.

At S3, remote receiving is performed. After learning, by querying through a GPS SDK interface, that the time provided by the GPS device reaches the time for test, a GPS synchronization control unit sends a command to a testing App to turn on the remote terminal to capture the output of the audio system under test. The receiver continues capturing until a predetermined duration is reached, and then the receiver sends the captured test audio codebook and the original audio codebook to a delay measuring module.

In the embodiment according to the present disclosure, synchronization of sending and receiving for long-distance or short-distance is achieved based on GPS, and the problem that the accuracy of the delay is affected by the asymmetry of the upload/download paths is avoided by the one-way capture. And the one-way capture can avoid disturbance and impact, caused by echoes, on the calculation of the delay, which improves the accuracy of delay measurement.

Figure 13:
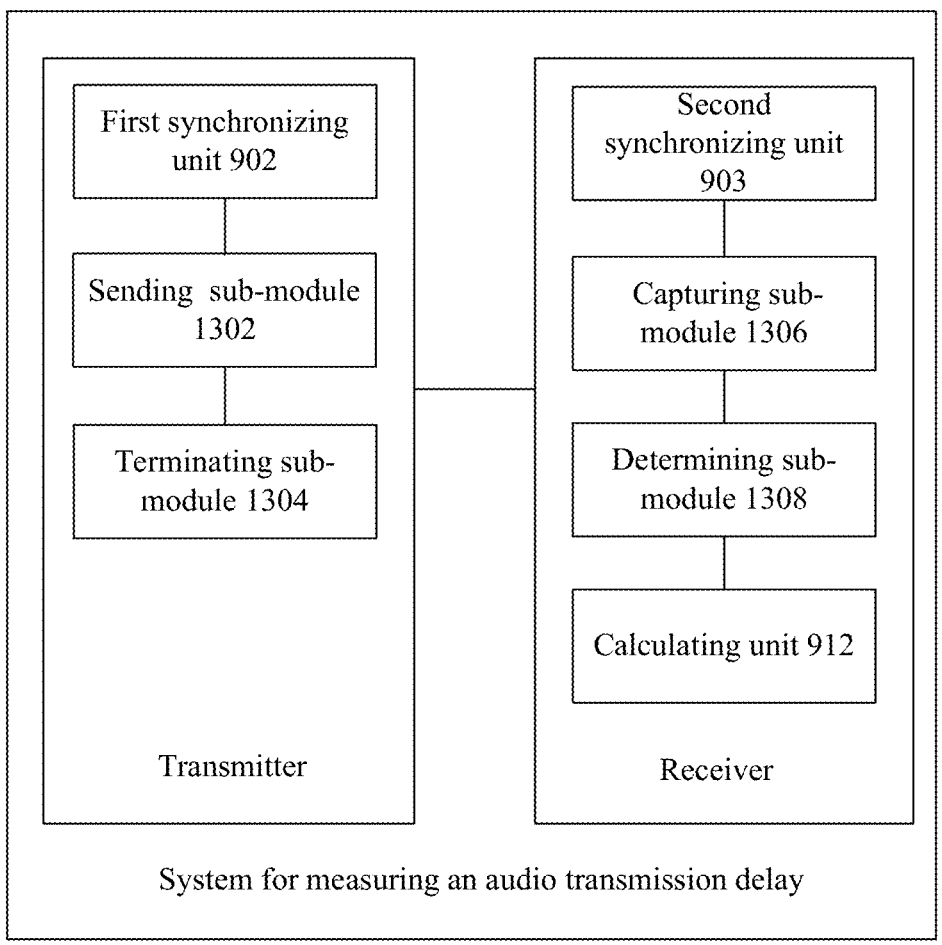
FIG. 13 is a schematic diagram of still another optional apparatus for measuring an audio transmission delay according to an embodiment of the invention.

Optionally, as shown in FIG. 13, the system is further described as follows.

1) The first responding unit 904 includes a sending sub-module 1302, configured to start sending the original audio codebook to the receiver when receiving first instruction information, where the first instruction information is used to instruct the receiver to be prepared for receiving.

Optionally, instruction information may be called signaling information in the embodiment. And the instruction information described above is transmitted based on a signaling control server (SyncServer). Optionally, synchronization of sending and receiving for the short-distance can be achieved based on the signaling control server.

For example, as shown in FIG. 7, the transmitter is a local audio application terminal, the receiver is a remote audio application terminal and the local audio application terminal transmits the original audio codebook to the remote audio application terminal through a transmission network. When receiving the sending start instruction information, i.e., the first instruction information, the local audio application terminal instructs, according to the received first instruction information, the remote audio application terminal to be prepared for capturing audio.

2) The second responding unit 906 includes a terminating sub-module 1304, configured to stop sending the original audio codebook to the receiver when receiving second instruction information, where the second instruction information is used to instruct an end of playing of the original audio codebook.

For example, as shown in FIG. 7, the transmitter is the local audio application terminal, the receiver is the remote audio application terminal and the local audio application terminal transmits the original audio codebook to the remote audio application terminal through the transmission network. When receiving the sending end instruction information, i.e., the second instruction information, the local audio application terminal instructs, according to the received second instruction information, the remote audio application terminal that playing of original audio is finished.

3) The third responding unit 908 includes a capturing sub-module 1306, configured to start capturing the original audio codebook from the transmitter when receiving third instruction information, where the third instruction information is used to instruct the receiver to start receiving.

For example, as shown in FIG. 7, the transmitter is the local audio application terminal, the receiver is the remote audio application terminal and the local audio application terminal transmits the original audio codebook to the remote audio application terminal through the transmission network. When the remote audio application terminal receives the receiving start instruction information, i.e., the third instruction information, the remote audio application terminal is instructed to start capturing the original audio according to the received third instruction information.

4) The fourth responding unit 910 includes a determining sub-module 1308, configured to determine whether duration for capturing the original audio codebook from the transmitter exceeds capturing duration and stop capturing the original audio codebook from the transmitter in a case that the duration for capturing the original audio codebook from the transmitter exceeds the capturing duration.

For example, as shown in FIG. 7, the transmitter is the local audio application terminal, the receiver is the remote audio application terminal and the local audio application terminal transmits the original audio codebook to the remote audio application terminal through the transmission network. The remote audio application terminal receives the receiving end instruction information, which includes the capturing duration $T_t$ carried in the second instruction information.

A specific flow of the instruction-controlled synchronization processing above of a synchronization control apparatus is further described in conjunction with FIG. 8. The local audio application terminal and the remote audio application terminal play and capture audio through testing Apps. It includes the following steps.

At S1, the local audio application terminal and the remote audio application terminal run a voice system under test, start synchronization test control clients and successfully log in to the SyncServer. After they both successfully log in, the SyncServer creates a testing session. Two sides of the testing session are represented by side A and side B, respectively.

At S2, any of the two sides (for example, side A) initiates an audio testing session request "SyncRequest" (the request carrying information of the serial number of the codebook), which is transferred to the other side (side B) of the testing session via a control end of the SyncServer.

At S3, the other side (side B) initializes/turns on an audio resource capturing device after receiving the testing session request "SyncRequest", creates header information such as a degraded codebook filename/an audio sampling rate and the number of sound tracks/the number of bits of a sample, according to the serial number of the codebook, to record an audio output signal of the system under test, and returns confirmation information "Sync Ok" of being prepared to the initiator (side A) of the testing session via the SyncServer.

At S4, the initiator (side A) of the testing session sends a signaling (Ok Begin Play) for starting playing an audio codebook to the other side (side B) after receiving a signaling, transferred by the SyncServer, indicating that the opposite terminal is prepared, and immediately starts playing a reference codebook signal. The played reference codebook audio signal is input to and captured by the audio system under test, goes through all processes thereof (pre-processing, coding, packing, transmitting through a network, unpacking, decoding, post-processing and playing) and is captured by a test control client at the other side after being played and output by the other side.

At S5, the other side (side B) immediately starts audio inner recording to capture the output of the audio system under test once receiving the signaling "Ok Begin Play", and returns a signaling (Is Inner Recording) indicating that inner recording is being performed on the output of the audio system under test to the initiator (A).

At S6, the initiator (side A) of the testing session sends a signaling "Play Ended" (carrying duration of the test codebook) to the other side (side B) once finishing playing the reference audio codebook. After receiving the signaling, the other side determines whether the capturing duration is reached. In a case that the capturing duration is reached, the other side stops capturing the output signal of the audio system under test and outputs the recorded codebook signal.

In the embodiment according to the present disclosure, synchronization operation of the transmitter and the receiver is achieved through instruction-based synchronization control, and a one-way capturing method is used, avoiding the problem that the delay accuracy is affected by echoes and path asymmetry and improving the accuracy of delay measurement.

Optionally, the calculating unit 912 includes a first calculating module, configure to calculate the audio transmission delay based on the following formula:

$$R_{xy}(\tau) = \int_{t_s}^{t_e} x(t)y(t+\tau)dt \quad (1)$$

where $R_{xy}(\tau)$ is a value of a cross-correlation function between the original audio codebook and the test audio codebook corresponding thereto, $t_s$ is the time when the receiver starts capturing the original audio codebook from the transmitter, $t_e$ is the time when the receiver stops capturing the original audio codebook from the transmitter, $\tau$ is time information corresponding to each sampling point, $x(t)$ is an energy value corresponding to a sampling point at time t in the original audio codebook, $\tau$ is an offset of a sampling point in the test audio codebook used in convolution with $x(t)$, and $y(t+\tau)$ is an energy value of a sampling point at time $t+\tau$ in the test audio codebook. The audio transmission delay is represented by the value of $\tau$ corresponding to a maximum value of the cross-correlation function.

The maximum cross-correlation function $R_{xy}(\tau)$ between the original audio codebook and the obtained test audio codebook and the value of the subscript $\tau$ corresponding thereto are solved, and an estimated delay value can be obtained by dividing the value of $\tau$ by the sampling rate information of a corresponding audio codebook.

Optionally, the audio delay is obtained by solving the cross-correlation between audio signals, in the delay calculation of the embodiment, and the solved audio delay includes a crude audio overall delay "Delay-crude" and an internal audio delay "Delay-internal". The crude overall delay "Delay-crude" is a delay value which is obtained based on a maximum overall cross-correlation between a reference codebook and an output audio codebook recorded by the synchronization control unit. The audio sub-segment delay "Delay-internal" is obtained as follows: after the crude overall delay is solved, audio sub-segment division and alignment is performed on the audio signal in the codebook, and then the delay between each audio sun-segment in the reference codebook and a corresponding audio sub-segment in the output audio codebook recorded by the synchronization control unit is solved. The delay value finally solved is the crude overall audio delay "Delay-crude" plus the internal audio delay "Delay-internal".

Optionally, a normalized maximum cross-correlation coefficient $\rho_{xy}(\tau)$ and a corresponding subscript time $\tau$ can be calculated after normalizing the cross-correlation function value above according to the formula:

$$\rho_{xy}(\tau) = \frac{\int_{t_s}^{t_e} x(t)y(t+\tau)dt}{\sqrt{\int_{t_s}^{t_e}[x(t)\cdot x(t)]dt \int_{t_s}^{t_e}[y(t)\cdot y(t)]dt}}. \quad (2)$$

As to delay estimation in a scenario of an audio playing codebook with a high sampling rate (≥44.1K, 48K, 96K and do on), data of one frame of codebook file may be easy to process. Thus, audio envelopes can be obtained from the codebook audio file at a small window of Tms, and a maximum cross-correlation value between the envelopes can be obtained, to obtain a corresponding delay value t, which includes the following steps.

At S1, a window is applied to a voice/audio signal at Tms.

Optionally, the applied window in the embodiment includes at least one of the following: a Hamming window, a Hann window, a hamming window, a triangle window, a Bartlett window and a Kaiser window.

For example, in a case that the window function is a rectangular window, which is defined by the formula:

$$w(n) = \begin{cases} 1, & 0 \leq n < N \\ 0 \end{cases} \quad (3)$$

a kth frame of voice signal to which a window is applied is expressed by the formula: $Xk(n)=w(n)*x(k*N+n)$. An average of energy of the kth frame of signal, $Xk(n)$, is expressed by $E(k)$:

$$E(k) = \frac{1}{N} = \sum_{n=1}^{N-1} X_k(n) * X_k(n). \quad (4)$$

At S2, an envelope information value is obtained for every Tms frame. The envelope information is obtained by calculating a logarithm of a value obtained by normalizing a square root of the voice energy signal and represents a short-term voice energy change. The envelope of the kth frame of voice signal is expressed by Env(k):

$$Env(k) = 20 * \log 10 \left( \frac{\sqrt{\frac{1}{N} \sum_{n=1}^{N-1} X_k(n) * X_k(n)}}{32768} \right). \quad (5)$$

At S3, a maximum value of a cross-correlation function between envelops of a played codebook signal and a recorded degraded signal of the system under test and a corresponding time τ. In playing high-quality codebook signal, x(t) or y(t) in the cross-correlation function or the cross-correlation coefficient can be replaced with the envelop value obtained by applying the window to the reference codebook and the test codebook, respectively, to obtain the position of a corresponding delayed sample, which can be converted into time with the sampling rate to obtain a delay value.

Optionally, the calculating unit 912 includes a second calculating module, configured to calculate the audio transmission delay according to the following formula:

$$Delay_i = \frac{1}{m} \sum_{k=1}^{m} TestValue(k), \quad (6)$$

where TestValue(k) is a delay value corresponding to the maximum value of the cross-correlation function obtained by solving an ith original audio codebook and an ith test audio codebook corresponding thereto obtained through a kth measurement of the ith original audio codebook, the delay value is a time-domain value obtained by dividing a value of τ corresponding to the maximum value of the cross-correlation function obtained through the kth measurement by the sampling rate information adopted by the receiver in the kth measurement, the sampling rate information is a sampling rate in header information of the ith original audio codebook, $Delay_i$, is an average audio transmission delay of the ith original audio codebook and m is an integer greater than or equal to 1.

Optionally, the calculating unit 912 includes a third calculating module configured to calculate the audio transmission delay according to the following formula:

$$Avg\_Delay = \frac{1}{n} \sum_{i=1}^{n} Delay_i, \quad (7)$$

where Avg_Delay is the average audio transmission delay of n original audio codebooks and n is an integer greater than or equal to 1.

In the embodiment according to the present disclosure, energy values of sampling points are calculated based on the cross-correlation function, thereby achieving accurate calculation of the audio transmission delay.

Optionally, in the embodiment above, the system for measuring an audio transmission delay can be applied in short-distance communications.

The serial numbers of the embodiments according to the present disclosure are merely used for a purpose of description, and do not represent merits of the embodiments.

Descriptions of the embodiments according to the present disclosure emphasize different aspects, and for a part, which is not described in detail, of an embodiment, reference can be made to related descriptions in other embodiments.

It should be understood that the client disclosed in the embodiments according to the present disclosure may be implemented in other ways. For example, the apparatus embodiments described above are illustrative only. For example, the division of the units is merely a logical function division and there may be other divisions in practical implementations. For example, multiple units or components may be combined or integrated into another system, or some features may be ignored or not performed. In addition, the displayed or discussed mutual couplings or direct couplings or communication connections may be implemented through some interfaces. The indirect couplings or communication connections between modules or units may be implemented electrically or in other forms.

The units described as separate parts may or may not be physically separate, and parts displayed as units may or may not be physical units, which may be located in one position or distributed in multiple network units. Some or all of the units may be selected as needed to achieve the objectives of the solutions according to the embodiments.

In addition, functional units in the embodiments of the present disclosure may be integrated into one processing unit, or each of the units may exist alone physically, or two or more units are integrated into one unit. The integrated unit above may be implemented in the form of hardware, or in the form of software functional unit.

When being implemented in the form of software functional unit sold or used as a independent product, the integrated unit may be stored in a computer readable storage medium. Based on such understanding, the essence or the part contributing to conventional technology of the technical solutions according to the present disclosure, or a part or all of the technical solutions may be implemented in the form of a computer software product. The computer software product is stored in a storage medium and includes instructions to enable a computer device (which may be, such as, a personal computer, a server, or a network device) to executive all or a part of steps of the method according to each of the embodiments in the present disclosure. The storage medium may be any medium that can store program codes, such as an U-disk, a read-only memory (ROM), a random access memory (RAM), a mobile hard disk drive, a magnetic disk, or an optical disk and so on.

The embodiments above are only some preferred embodiments of invention. It should be noted that improvements and modifications made by those in the art without deviating from the principle of the invention shall fall with the scope of the present disclosure.

The invention claimed is:

1. A method for measuring an audio transmission delay, comprising:

performing synchronization operation on transmission of an original audio codebook to be tested between a transmitter and a receiver, to determine sending start instruction information, sending end instruction information, receiving start instruction information and receiving end instruction information of the original audio codebook;

starting, by the transmitter, sending the original audio codebook to the receiver according to the sending start instruction information;

stopping, by the transmitter, sending the original audio codebook to the receiver according to the sending end instruction information;

starting, by the receiver, capturing the original audio codebook from the transmitter according to the receiving start instruction information to obtain a test audio codebook;

stopping, by the receiver, capturing the original audio codebook from the transmitter according to the receiving end instruction information; and obtaining the audio transmission delay based on the test audio codebook captured by the receiver and the original audio codebook pre-stored in the receiver, wherein obtaining the audio transmission delay based on the test audio codebook captured by the receiver and the original audio codebook pre-stored in the receiver comprises:

$$R_{xy}(t) = \int_{ts}^{te} x(t)y(t+t)dt,$$

$$\text{Delay}_i = \frac{1}{m}\sum_{k=1}^{m} TestValue(k), \text{ and}$$

$$\text{Avg\_Delay} = \frac{1}{n}\sum_{i=1}^{n} \text{Delay}_i,$$

wherein $R_{xy}(\tau)$ is a value of a cross-correlation function between the original audio codebook and the test audio codebook corresponding thereto, $t_s$ is a time when the receiver starts capturing the original audio codebook from the transmitter, $t_e$ is a time when the receiver stops capturing the original audio codebook from the transmitter, t is time information corresponding to each sampling point, x(t) is an energy value corresponding to a sampling point at time t in the original audio codebook, $\tau$ is an offset of a sampling point in the test audio codebook used in convolution with x(t), and y(t+$\tau$) is an energy value corresponding to a sampling point at time t+$\tau$ in the test audio codebook, wherein the audio transmission delay is represented by a value of $\tau$ corresponding to a maximum value of the cross-correlation function, wherein TestValue(k) is a delay value corresponding to a maximum value of the cross-correlation function obtained by solving an ith original audio codebook and an ith test audio codebook corresponding thereto obtained through a kth measurement of the ith original audio codebook, the delay value is a time-domain value obtained by dividing a value of $\tau$ corresponding to the maximum value of the cross-correlation function obtained through the kth measurement by sampling rate information adopted by the receiver in the kth measurement, the sampling rate information is a sampling rate in header information of the ith original audio codebook, $\text{Delay}_i$ is an average audio transmission delay of the ith original audio codebook, and m is an integer greater than or equal to 1, and wherein $^{Avg\_Delay}$ is an average audio transmission delay of n original audio codebooks and n is an integer greater than or equal to 1.

2. The method according to claim 1, wherein:

the sending start instruction information comprises a sending start time, the sending end instruction information comprises a sending end time, the receiving start instruction information comprises a receiving start time and the receiving end instruction information comprises a receiving end time;

starting, by the transmitter, sending the original audio codebook to the receiver according to the sending start instruction information comprises starting, by the transmitter, sending the original audio codebook to the receiver at the sending start time;

stopping, by the transmitter, sending the original audio codebook to the receiver according to the sending end instruction information comprises stopping, by the transmitter, sending the original audio codebook to the receiver at the sending end time;

starting, by the receiver, capturing the original audio codebook from the transmitter according to the receiving start instruction information comprises starting, by the receiver, capturing the original audio codebook from the transmitter at the receiving start time; and stopping, by the receiver, capturing the original audio codebook from the transmitter according to the receiving end instruction information comprises stopping, by the receiver, capturing the original audio codebook from the transmitter at the receiving end time.

3. The method according to claim 2, wherein:

the sending start time is the same as the receiving start time, and the sending end time is the same as the receiving end time; or the sending start time is the same as the receiving start time, and a difference between the sending end time and the receiving end time is smaller than a first predetermined threshold; or a difference between the sending start time and the receiving start time is smaller than a second predetermined threshold, and the sending end time is the same as the receiving end time; or the difference between the sending start time and the receiving start time is smaller than a third predetermined threshold, and the difference between the sending end time and the receiving end time is smaller than a fourth predetermined threshold.

4. The method according to claim 1, wherein performing synchronization operation on transmission of the original audio codebook to be tested between the transmitter and the receiver comprises:

performing information interaction between the transmitter and the receiver, so that an order in which the transmitter sends a plurality of original audio codebooks is the same as an order in which the receiver receives the plurality of original audio codebooks.

5. The method according to claim 2, wherein performing synchronization operation on transmission of the original audio codebook to be tested between the transmitter and the receiver comprises:

performing synchronization operation on transmission of the original audio codebook between the transmitter and the receiver by a first GPS synchronization control unit arranged in the transmitter and a second GPS synchronization control unit arranged in the receiver, wherein each of the first GPS synchronization control unit and the second GPS synchronization control unit comprises a GPS device which comprises a GPS antenna and a GPS receiving module, wherein the GPS antenna is configured to transmit at least one of the sending start time, the sending end time, the receiving start time, and the receiving end time, and wherein the GPS receiving module is configured to receive at least one of the sending start time, the sending end time, the receiving start time and the receiving end time.

6. The method according to claim 1, wherein:

the sending start instruction information comprises first instruction information for instructing the receiver to be prepared for receiving, the sending end instruction information comprises second instruction information for instructing an end of playing of the original audio codebook, the receiving start instruction information comprises third instruction information for instructing the receiver to start receiving, and the receiving end instruction information comprises capturing duration carried in the second instruction information;

starting, by the transmitter, sending the original audio codebook to the receiver according to the sending start instruction information comprises starting, by the transmitter, sending the original audio codebook to the receiver in response to receiving the first instruction information;

stopping, by the transmitter, sending the original audio codebook to the receiver according to the sending end instruction information comprises stopping, by the transmitter, sending the original audio codebook to the receiver in response to receiving the second instruction information;

starting, by the receiver, capturing the original audio codebook from the transmitter according to the receiving start instruction information comprises starting, by the receiver, capturing the original audio codebook from the transmitter in response to receiving the third instruction information; and stopping, by the receiver, capturing the original audio codebook from the transmitter according to the receiving end instruction information comprises determining, by the receiver, whether duration for capturing the original audio codebook from the transmitter exceeds the capturing duration, and stopping capturing the original audio codebook from the transmitter in a case that the duration for capturing the original audio codebook from the transmitter exceeds the capturing duration.

7. A system for measuring an audio transmission delay, comprising:

a transmitter;

a receiver;

one or more processors; and one or more memories storing program instructions, that when executed by the one or more processors, configure the system to perform the following operations:

performing synchronization operation on transmission of an original audio codebook to be tested between the transmitter and the receiver, and determining sending start instruction information, sending end instruction information, receiving start instruction information, and receiving end instruction information of the original audio codebook;

starting, by the transmitter, sending the original audio codebook to the receiver according to the sending start instruction information;

stopping, by the transmitter, sending the original audio codebook to the receiver according to the sending end instruction information;

starting, by the receiver, capturing the original audio codebook from the transmitter according to the receiving start instruction information to obtain a test audio codebook;

stopping, by the receiver, capturing the original audio codebook from the transmitter according to the receiving end instruction information; and obtaining the audio transmission delay based on the test audio codebook and the original audio codebook pre-stored in the receiver, wherein obtaining the audio transmission delay based on the test audio codebook captured by the receiver and the original audio codebook pre-stored in the receiver comprises:

$$R_{xy}(t) = \int_{ts}^{te} x(t)y(t+t)dt$$

$$Delay_i = \frac{1}{m}\sum_{k=1}^{m} TestValue(k), \text{ and}$$

$$Avg\_Delay = \frac{1}{n}\sum_{i=1}^{n} Delay_i,$$

wherein $R_{xy}(\tau)$ is a value of a cross-correlation function between the original audio codebook and the test audio codebook corresponding thereto, $t_s$ is a time when the receiver starts capturing the original audio codebook from the transmitter, $t_e$ is a time when the receiver stops capturing the original audio codebook from the transmitter, t is time information corresponding to each sampling point, x(t) is an energy value corresponding to a sampling point at time t in the original audio codebook, $\tau$ is an offset of a sampling point in the test audio codebook used in convolution with x(t), and y(t+$\tau$) is an energy value corresponding to a sampling point at time t+τ in the test audio codebook, wherein the audio transmission delay is represented by a value of τ corresponding to a maximum value of the cross-correlation function, wherein TestValue(k) is a delay value corresponding to a maximum value of the cross-correlation function obtained by solving an ith original audio codebook and an ith test audio codebook corresponding thereto obtained through a kth measurement of the ith original audio codebook, the delay value is a time-domain value obtained by dividing a value of τ corresponding to the maximum value of the cross-correlation function obtained through the kth measurement by sampling rate information adopted by the receiver in the kth measurement, the sampling rate information is a sampling rate in header information of the ith original audio codebook, $Delay_i$ is an average audio transmission delay of the ith original audio codebook, and m is an integer greater than or equal to 1, and wherein Avg_Delay is an average audio transmission delay of n original audio codebooks and n is an integer greater than or equal to 1.

8. The system according to claim 7, wherein:
starting, by the transmitter, sending the original audio codebook to the receiver according to the sending start instruction information comprises starting, by the transmitter, sending the original audio codebook to the receiver at a sending start time, wherein the sending start instruction information comprises the sending start time;
stopping, by the transmitter, sending the original audio codebook to the receiver according to the sending end instruction information comprises stopping, by the transmitter, sending the original audio codebook to the receiver at a sending end time, wherein the sending end instruction information comprises the sending end time;
starting, by the receiver, capturing the original audio codebook from the transmitter according to the receiving start instruction information comprises starting, by the receiver, capturing the original audio codebook from the transmitter at a receiving start time, wherein the receiving start instruction information comprises the receiving start time; and
stopping, by the receiver, capturing the original audio codebook from the transmitter according to the receiving end instruction information comprises stopping, by the receiver, capturing the original audio codebook from the transmitter at a receiving end time, wherein the receiving end instruction information comprises the receiving end time.

9. The system according to claim 8, wherein:
the sending start time is the same as the receiving start time, and the sending end time is the same as the receiving end time; or
the sending start time is the same as the receiving start time, and a difference between the sending end time and the receiving end time is smaller than a first predetermined threshold; or
a difference between the sending start time and the receiving start time is smaller than a second predetermined threshold, and the sending end time is the same as the receiving end time; or
the difference between the sending start time and the receiving start time is smaller than a third predetermined threshold, and the difference between the sending end time and the receiving end time is smaller than a fourth predetermined threshold.

10. The system according to claim 7, wherein performing synchronization operation on transmission of the original audio codebook to be tested between the transmitter and the receiver comprises:
performing information interaction between the transmitter and the receiver, so that an order in which the transmitter sends a plurality of original audio codebooks is the same as an order in which the receiver receives the plurality of original audio codebooks.

11. The system according to claim 8, wherein performing synchronization operation on transmission of the original audio codebook to be tested between the transmitter and the receiver comprises:
performing synchronization operation on transmission of the original audio codebook between the transmitter and the receiver by a first GPS synchronization control unit arranged in the transmitter and a second GPS synchronization control unit arranged in the receiver,
wherein each of the first GPS synchronization control unit and the second GPS synchronization control unit comprises a GPS device which comprises a GPS antenna and a GPS receiving module,
wherein the GPS antenna is configured to transmit at least one of the sending start time, the sending end time, the receiving start time, and the receiving end time, and
wherein the GPS receiving module is configured to receive at least one of the sending start time, the sending end time, the receiving start time and the receiving end time.

12. The system according to claim 7, wherein:
starting, by the transmitter, sending the original audio codebook to the receiver according to the sending start instruction information comprises starting, by the transmitter, sending the original audio codebook to the receiver in response to receiving first instruction information, wherein the first instruction information is used to instruct the receiver to be prepared for receiving;
stopping, by the transmitter, sending the original audio codebook to the receiver according to the sending end instruction information comprises stopping, by the transmitter, sending the original audio codebook to the receiver in response to receiving second instruction information, wherein the second instruction information is used to instruct an end of playing of the original audio codebook;
starting, by the receiver, capturing the original audio codebook from the transmitter according to the receiving start instruction information comprises starting, by the receiver, capturing the original audio codebook from the transmitter in response to receiving third instruction information, wherein the third instruction information is used to instruct the receiver to start receiving; and
stopping, by the receiver, capturing the original audio codebook from the transmitter according to the receiving end instruction information comprises determining, by the receiver, whether duration for capturing the original audio codebook from the transmitter exceeds the capturing duration, and stopping capturing the original audio codebook from the transmitter in a case that the duration for capturing the original audio codebook from the transmitter exceeds the capturing duration.

* * * * *